(12) United States Patent
Jarrett et al.

(10) Patent No.: US 12,037,512 B2
(45) Date of Patent: Jul. 16, 2024

(54) PRIMER, INK, AND VARNISH COMPOSITIONS AND ASSOCIATED PRINTING APPARATUS

(71) Applicant: FILSEN PTY LTD, Sydney (AU)

(72) Inventors: Kevin George Jarrett, Casula (AU); Ian Joseph Wilson, Northbridge (AU); Phillip Wayne Lawrence, Cammeray (AU)

(73) Assignee: FILSEN PTY LTD, Sydney (AU)

( * ) Notice: Subject to any disclaimer, the term of this patent is extended or adjusted under 35 U.S.C. 154(b) by 798 days.

(21) Appl. No.: 17/050,159

(22) PCT Filed: Apr. 26, 2019

(86) PCT No.: PCT/AU2019/050374
§ 371 (c)(1),
(2) Date: Oct. 23, 2020

(87) PCT Pub. No.: WO2019/204880
PCT Pub. Date: Oct. 31, 2019

(65) Prior Publication Data
US 2021/0095135 A1    Apr. 1, 2021

(30) Foreign Application Priority Data

Apr. 27, 2018   (AU) ................................ 2018901395

(51) Int. Cl.
*C09D 4/00* (2006.01)
*B05D 3/06* (2006.01)
(Continued)

(52) U.S. Cl.
CPC ............... *C09D 4/00* (2013.01); *B05D 3/067* (2013.01); *B05D 3/068* (2013.01); *B41M 1/04* (2013.01); *B41M 5/0023* (2013.01); *B41M 5/5209* (2013.01); *B41M 7/0045* (2013.01); *B41M 7/0081* (2013.01); *C08F 20/06* (2013.01); *C08K 3/16* (2013.01); *C08K 3/22* (2013.01);
(Continued)

(58) Field of Classification Search
None
See application file for complete search history.

(56) References Cited

U.S. PATENT DOCUMENTS 4,072,784 A    2/1978  Cirino et al.
4,647,951 A    3/1987  Yamori et al.
(Continued)

FOREIGN PATENT DOCUMENTS

CN    1594427 A    3/2005
CN    1240774 C    2/2006
(Continued)

*Primary Examiner* — Colin W. Slifka
(74) *Attorney, Agent, or Firm* — Buscher Patent PLLC

(57) ABSTRACT

The invention herein relates to a curable composition, such as UV or EB curable composition, comprising: a metal salt comprising an anionic form of an organic compound, which organic compound comprises at least one polymerisable unsaturated group and an acidic hydrogen; and water. The curable composition is suitable for priming, printing on, or varnishing a substrate, as well as to methods of preparing said compositions, methods for priming, printing on, or varnishing a substrate, and printing presses utilising said compositions.

20 Claims, 3 Drawing Sheets

(51) Int. Cl.
- *B41M 1/04* (2006.01)
- *B41M 5/00* (2006.01)
- *B41M 5/52* (2006.01)
- *B41M 7/00* (2006.01)
- *C08F 20/06* (2006.01)
- *C08K 3/16* (2006.01)
- *C08K 3/22* (2006.01)
- *C09D 5/00* (2006.01)
- *C09D 7/61* (2018.01)
- *C09D 11/037* (2014.01)
- *C09D 11/101* (2014.01)
- *C09D 11/107* (2014.01)
- *C09D 133/02* (2006.01)

(52) U.S. Cl.
CPC ............... *C09D 5/002* (2013.01); *C09D 7/61* (2018.01); *C09D 11/037* (2013.01); *C09D 11/101* (2013.01); *C09D 11/107* (2013.01); *C09D 133/02* (2013.01); *C08K 2003/162* (2013.01); *C08K 2003/222* (2013.01); *C08K 2003/2296* (2013.01)

(56) References Cited

U.S. PATENT DOCUMENTS

| | | |
|---|---|---|
| 7,317,061 B2 | 1/2008 | Narayan-Sarathy et al. |
| 2005/0065232 A1 | 3/2005 | Okimoto et al. |
| 2008/0039543 A1 | 2/2008 | Narayan-Sarathy et al. |
| 2008/0085981 A1 | 4/2008 | Narayan-Sarathy et al. |
| 2009/0068415 A1 | 3/2009 | Kawakami |
| 2010/0041816 A1 | 2/2010 | Ikoshi et al. |
| 2016/0152034 A1 | 6/2016 | Masumi et al. |
| 2017/0209382 A1 | 7/2017 | Noveron et al. |

FOREIGN PATENT DOCUMENTS

| | | |
|---|---|---|
| EP | 1464686 | 10/2004 |
| EP | 2204423 A1 | 7/2010 |
| JP | 2009062495 | 3/2009 |
| JP | 2009062495 A * | 3/2009 |
| WO | WO 1997/014756 A1 | 4/1997 |
| WO | WO2009031509 A1 | 3/2009 |
| WO | WO 2011/079402 A1 | 7/2011 |
| WO | WO 2013/132439 A1 | 9/2013 |
| WO | WO 2015/183719 A1 | 12/2015 |
| WO | WO 2016/007593 A1 | 1/2016 |
| WO | WO 2018/076068 | 5/2018 |

* cited by examiner

| FLOW PLATE TEST RESULTS | | |
|---|---|---|
| mm | Subject ink | Commercial UV flexo ink |
| 20 | ■ | ▨ |
| 40 | ■ | ▨ |
| 60 | ■ | ▨ |
| 80 | ■ | ▨ |
| 100 | ■ | ▨ |
| 120 | ■ | ▨ |
| 140 | | |

Fig. 3

PRIMER, INK, AND VARNISH COMPOSITIONS AND ASSOCIATED PRINTING APPARATUS

FIELD OF THE INVENTION

The present invention relates to curable primer, ink, and varnish compositions, and printing processes and apparatus that utilise these compositions. In one embodiment, the invention relates to curable compositions for use in a complete printing system, where a substrate is primed with a primer, printed with an ink, and protected or enhanced with a varnish, each composition being according to the present invention. However, it will be appreciated that the invention is not limited to use in this manner, and nor is it limited to use in the field of printing.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of the common general knowledge in the field. Whilst the present invention has been described in several embodiments in the following discussion in relation to paper materials, paper products, flexible polymeric and metallic substrates it will be appreciated that the present invention is not limited to such materials.

Inkjet printing on office and home printers has been commonplace for over 10 years. However, it is only in the last five years that inkjet printing has started to make serious inroads in commercial printing other than display printing applications. The main advantage of inkjet printing for industrial or commercial printing is that the setup time is greatly reduced by eliminating the requirement for production and use of printing plates, and that the computerised systems which control the printing process can be easily programmed to print different jobs one after the other, with as many or as few copies as required. Within each print job it is the ability to handle "variable data" and create audience targeting which sets digital printing apart from its predecessor forms, which include offset, letterpress, gravure and flexographic (flexo), all of which require the making of prepress plates, sleeves or cylinders which dictates a minimum run length for a commercially viable result. Commercial application of inkjet printing allows the economic printing of very short run jobs which can include books, newspapers, brochures, leaflets, flyers as well as a wide range of other advertising materials and other commercial printing.

The take-up of industrial and commercial inkjet printing has, however, been relatively slow due to the high cost of the inks and special-purpose papers required. Technically, the inks also have some shortcomings since their very high water content creates a degree of show-through on lightweight papers and newsprint in particular, and that same high water content also means considerable heat has to be applied to dry the inks adequately. Paper generally does not respond well to high degrees of applied heat after its initial formation at the paper mill since it can significantly reduce the moisture content, resulting in the need to re-moisten the sheet before subsequent post-printing operations including folding, cutting and binding.

Conventional water-based inkjet inks also have a limited range of substrates to which they achieve adequate adhesion. Even for paper, it has been found necessary to manufacture specialist papers for inkjet inks to provide reasonable quality printing. These papers can be typically up to 50% more expensive than papers used for the previous generation of printing modalities. When this expense is combined with the cost of the conventional inkjet inks, the overall consumables cost is considerable, and has had a negative impact on the take-up rate of inkjet printing in commercial and industrial applications.

Conventional water-based inkjet inks using water dispersible resins (in the form of an emulsion or a colloid) can be up to 90% water by weight. They are made with either dye or pigments as colorants, with the latter being even more expensive than the former. Accordingly, as described in International PCT publication No. WO 2013/132439 A1, these inks may require high temperatures above 100° C. to evaporate the water content and dry the inks, which involves additional processing steps and increases the overall cost of printing.

UV inkjet inks are also commercially available, which are generally not water-based but mostly made from 100% solids hydrophobic monomers and oligomers and diluted with volatile organic solvents (VOCs), for example glycol ether solvents. These inks are generally used for wide format printing of banners and polymeric films and other synthetic substrates and large-scale commercial jobs in sheet form and, by comparison with conventional water-based inkjet inks, have a wider range of substrates to which they can provide adequate adhesion. These inks can also be used for the printing of labels where the emphasis is generally printing on polymer film. They can also be used for so-called "4-D printing" which involves jetting the inks onto 3-D objects such as PET bottles and aluminium cans.

An example of this type of ink is described in International PCT Publication No. WO 2016/007593 A1 wherein the inventors acknowledge the need for inclusion of glycol ether solvents. The particular solvents nominated in this patent are stated by the US EPA to create the following health risks—"Acute (short-term) exposure to high levels of the glycol ethers in humans results in narcosis, pulmonary oedema, and severe liver and kidney damage. Chronic (long-term) exposure to the glycol ethers in humans may result in neurological and blood effects, including fatigue, nausea, tremor, and anaemia." For at least these reasons, it would be advantageous to avoid the use of VOCs in the printing process.

Commercially, another significant disadvantage of these inks is their cost, being more than five times the cost of UV lithographic inks and more than 10 times the cost of conventional lithographic or flexographic inks. As indicated previously, from an environmental perspective they are also undesirable since they contain VOCs, which the printing industry globally would prefer to phase out to reduce pollution and increase health and safety.

The only known commercially available water-based UV inkjet ink is manufactured by the SunJet Division of Sun Chemical, a subsidiary of Dainippon Ink and Chemical. However, these inks require a two-step process to completely cure them. First, they have to be exposed to considerable heat to drive off the high water content, followed by subjecting them to a form of radiation curing, such as UV or EB, for cross-linking and curing. WO 2015/183719A1 provides the detail of this 2-step process.

Flexographic inks are primarily used in the process of flexography to print ink on materials such as plastic bags, newspapers, catalogues, food packaging, corrugated cardboard, cardboard boxes, and other types of packing media. Flexographic printing, also referred to as flexo printing, is a very common and popular method for manufacturing large orders of custom labels. The flexographic printer is able to produce thousands of custom labels in a very short amount of time through the transfer of ink onto a material, such as paper, film, or cardboard. The printing material is mounted to fast-rotating cylinders using flexible printing plates.

The popularity of flexographic printing, which is an intaglio method, is due to its speed, cost-effectiveness, and reduced toll on the environment. Flexographic ink comes in three main varieties: solvent-based, water-based and UV/EB curable. The substrate type, or printing surface, will ultimately dictate the ink that will be used for each application. However, solvent-based inks have lessened in popularity due to their harmful impact on the environment, despite the fact that they are safe to be used for food packaging and other household applications. Further, of the three main forms of flexographic inks known in the art, solvent and water-based, both suffer from the disadvantage of requiring considerable energy input to create sufficient heat to evaporate the solvents and dry the inks. The level of heat input is sufficient from either IR or hot air sources to create drying-out of the paper substrates, requiring remoisturising of the web to enable subsequent post-printing operations. When the substrate is lightweight polymeric films which are subject to dimensional change on application of heat, significant challenges in printing occur to maintain registration. More recently, UV flexo inks have been developed for curing by either UV or EB and consequently require considerably less energy input. However, in the case of UV flexo inks, these require the addition of photoinitiators, and when used in food packaging applications in particular, expensive approved food safe photoinitiators. In the case of EB flexo inks known in the art, these require the provision of a nitrogen blanketing environment to inhibit the presence of oxygen at the curing surface which would otherwise prevent proper curing or drying of the ink. The cost of maintaining this nitrogen blanketing on an ongoing production basis is higher than the cost of electricity required to power the electron beam units. This significantly increases the total production cost.

Prior to application of ink, it is known in the art to apply a primer or coating to make the surface of a substrate more receptive to the ink. However, conventional primers and coatings are solutions designed to maintain the essential haptic or look and feel of the original substrate, and thus must be specifically tailored for application to a particular type of substrate and for a specific finish. Accordingly, printers are required to keep multiple different primer/coating compositions on hand to treat the variety of different printing substrates they use, and to achieve a range of different finishes for any given substrate, which incurs substantial costs and requires storage and handling of multiple primer/coating compositions.

It is also conventional in the art to convert matte paper substrates to glossy paper substrates by applying and drying several layers of calcium carbonate/clay coating and then subjecting that coating to an expensive and complex calendering process at the paper mill. That process involves running the paper web through rollers running at differential speeds which are heated to at least 200° C. and applying pressure to the paper web of up to 2000 psi. The process requires considerable energy input. In such a specialised calendering unit of a paper machine, the paper web is crushed to less than its original calliper and emerges with a gloss level which is dictated largely by the temperature, the pressure, and the material used to wrap the stainless-steel rollers. The material wrapping the steel rollers is generally a compressed cardboard material which wears out reasonably quickly resulting in high maintenance and running costs.

The use of energy-curable varnishes for use on various substrates is desirable primarily in order to protect and fix in place any underlying printing and to generally protect the substrate, but also to provide the substrates with properties such as grease and water resistance, and gloss. Common substrates that can require overprint varnishes (OPVs) include cellulose-based substrates such as magazine covers, food or beverage containers, or packaging. Such varnishes are often applied to the outer surface of the packaging or substrate and over any graphics printed on the packaging or substrate.

Typically, such varnishes comprise radiation-curable acrylate resins. However, polymerization of acrylates by ultraviolet (UV) radiation typically requires the addition of a photoinitiator. As many photoinitiators are capable of producing hazardous products upon irradiation (e.g., traditional ketone-type photoinitiators), the U.S. Food and Drug Administration has prohibited the use of most photoinitiators in food packaging applications where the coatings are in direct contact with food. Even in applications where the varnishes or inks do not directly contact the packaged food product, there is still a concern that one or more components of the varnishes or inks may migrate through the packaging film/substrate to contact the packaged food. Thus, the use of energy-curable coating compositions incorporating photoinitiators has been limited for food packaging applications.

The United States Food and Drug Administration (FDA) has, however, cleared some photoinitiators for use in food contact applications. One composition that has been cleared by the FDA includes a mixture of one or more of monomers (being tripropylene glycol diacrylate (TPGDA), trimethylolpropane triacrylate (TMPTA), trimethylolpropane ethoxylate triacrylate (TMPEOTA) and bisphenol A diglycidyl ether diacrylate), and an optional difunctional alpha-hydroxy ketone photoinitiator, which can be cured by either ultraviolet (UV) or electron beam (EB) radiation (see, e.g., Food Contact Notification FCN 772).

Radiation-curable resins are also known in the art which include "built-in" photocleavable moieties such that problems with odour which occur with the use of conventional photoinitiators are eliminated. See, for example, US 2008/0039543, US 2008/0085981, and U.S. Pat. No. 7,317,061. These curable compositions, however, can require nitrogen blanketing to eliminate the presence of oxygen to obtain sufficient free radical curing. Also, these compositions can be expensive.

Even with these improvements, it has been difficult to develop energy curable coatings suitable for use on substrates that will be in direct or indirect contact with food. Also, it has been difficult to develop energy curable coatings that can be applied and cured at high speed in a printing press. For example, pre-cured urethane acrylates, which are typically used in overprint varnishes and coatings, have high molecular weights and high viscosities which render them unsuitable for use as an overprint varnish in high-speed printing applications.

It would be desirable to be able to provide an energy curable composition for coating on substrates and packaging which provides desired gloss, and grease and water resistance properties, and can be used in food-related applications. It would also be desirable for such a coating to be applied and cured quickly and be inexpensive.

It is an object of the present invention to overcome or ameliorate one or more of the disadvantages of the prior art, or at least to provide a useful alternative.

It is an object of a preferred embodiment of the present invention to provide water based inkjet and flexographic (flexo) inks, primers or varnishes for application to paper, board, polymeric films and some metal surfaces including but not limited to aluminium and tin coated steel which are curable by UV or EB radiation without the need for any external heat to initially drive off water, thereby providing a 1-step curing process.

A further object of a preferred form of the invention is to provide inks, primers or varnishes which improve the overall energy efficiency of a printing or a coating process, respectively.

A further object of a preferred form of the invention is to provide inkjet inks which have low viscosity comparable to conventional inkjet inks which require heating to achieve a low viscosity.

A further object of a preferred form of the invention is to provide primers which enable a reduction of ink at substantially the same colour density compared to printing with the same ink on an uncoated cellulosic substrate.

A further object of a preferred form of the invention is to provide inks, primers and coatings which provide significant increase of tensile strength combined with reduction of "show-through" of print on lightweight paper substrates, and to facilitate colour printing, including 4-colour and other combinations of multicolour printing, with inkjet, whereas up until now these "thin paper" substrates have been limited to monochrome printing with inkjet, if they were printable at all.

It is an object of a preferred embodiment of the present invention to provide an energy curable composition which can be applied on a variety of substrates and cured to form a protective film or coating (overprint varnish) that is preferably clear, or which may be tinted.

A further object of a preferred form of the invention is to provide an energy curable composition which is suitable for use in food-contact applications.

A further objective of the preferred form of the invention is to provide energy curable compositions suitable to apply as overprint coatings in-line on a printing press over wet inks, prior to UV or EB curing the coatings, without the need to first cure or dry the inks.

Further objects of preferred forms of the invention are to provide energy curable compositions which are cost effective, and/or can be UV or EB cured under reduced or no nitrogen blanketing, and/or can be cured in the absence of (or the substantial absence of) commercial and/or conventional photoinitiators such that the coated substrate is suitable for use in food packaging or food contact-related applications.

A further object of a preferred form of the invention is to provide an energy curable composition which is curable at relatively reduced energy consumption, for example requiring less than 35% of the energy required to cure conventional EB products and without the need for a nitrogen environment. This latter attribute of the invention allows the use of EB curing in a sheet fed printing modality in addition to web coating and printing. This has never been previously achievable due to the practical difficulty of maintaining a nitrogen environment with the mechanical design of sheet fed presses. It also allows the EB curing of inks and coatings on 3D objects formed from cellulosic, polymeric or metallised substrates which has never previously been possible due to the requirement of a nitrogen blanketing environment for conventional EB cure products.

A further object of a preferred form of the invention is to provide coatings that can be used in the final stages of the papermaking process to provide surface finishes which are printable by digital toner and inkjet printing methods as well as conventional printing methods of lithographic and flexographic printing.

SUMMARY OF THE INVENTION

The present invention relates to curable compositions which can be applied to a range of substrates, including cellulosic, polymeric, or metallized substrates, and cured to form a protective layer (generally known in the art as an 'overprint varnish'), or as a primer coating, or as the base of an inkjet or flexographic ink. The substrates may be printed prior to coating with the overprint varnish. The curable compositions are curable upon exposure to sufficient UV or EB energy and in some embodiments, do not require addition of a commercial and/or conventional photoinitiator to initiate polymerisation, thereby reducing the cost of the composition and reducing complexity in formulation. In certain embodiments, the compositions herein provide a food contact certifiable surface. The compositions described herein are EB curable in the presence of air, thereby significantly reducing the costs of curing the composition as no expensive nitrogen blanket is required and the cost of the printing line apparatus is hence reduced. The possibility to cure in air without nitrogen blanketing and with reduced energy also means that the substrate may be coated and cured in some embodiments with significantly higher throughput and speed in a printing press, or papermaking line, compared to the prior art.

According to a first aspect, the present invention provides a curable composition comprising: a metal salt comprising an anionic form of an organic compound, said organic compound comprising at least one polymerisable unsaturated group and an acidic hydrogen; and water.

Preferably the metal salt comprises a metal selected from the group consisting of: aluminium, antimony, barium, calcium, cerium, chromium, cobalt, copper, germanium, indium, iron, lead, magnesium, manganese, mercury, nickel, ruthenium, rhenium, silicon, silver, thallium, tin, titanium, tungsten, vanadium, zirconium and zinc. In one embodiment, the metal salt comprises a metal selected from the group consisting of: zinc, titanium, chromium, tin, cerium, vanadium, zirconium and magnesium. In one embodiment, the metal salt is non-toxic to humans. In another embodiment, the metal salt is a food safe metal salt. In some embodiments, the metal salt may be photocatalytic. Preferably the metal salt comprises zinc or magnesium. Preferably the metal salt is present in the composition at a concentration of between about 5 and about 50 wt %.

Preferably the acidic hydrogen of the organic compound is from a carboxylic acid group and the anionic form of the organic compound is an acrylate or methacrylate.

Preferably the organic compound is selected from the group consisting of: unsaturated short chain ($C_3$-$C_5$) fatty acids, and unsaturated medium chain ($C_6$-$C_{12}$) fatty acids, or a combination thereof. Preferably the organic compound is methacrylic acid or acrylic acid.

Preferably the curable composition comprises a metal salt selected from the group consisting of: zinc acrylate, zinc methacrylate, magnesium acrylate and magnesium methacrylate.

Preferably the composition has a water content of between about 5 and about 35 wt %.

Preferably the composition comprises an additional component selected from the group consisting of: a co-monomer, a dye, a pigment, a filler, a wetting agent, and a defoamer or a mixture of any two or more of these. Preferably the composition comprises a co-monomer that is selected from the group consisting of: a molecular form of the organic compound, a sodium salt of the organic compound, or an ammonium salt of the organic compound. In one embodiment, the co-monomer is selected from the group consisting of: acrylic acid, methacrylic acid, sodium acrylate, sodium methacrylate, ammonium acrylate and ammonium methacrylate, or a combination of any two or more of these. In another embodiment, the composition comprises a co-monomer selected from the group consisting of sodium acrylate and ammonium acrylate. In some cases, these co-monomers also fulfil a filler and/or plasticiser function. Preferably the co-monomer is present in the composition at a concentration of between about 5 and 35 wt %. There may be between 50 and 400% more co-monomer in the composition than metal salt on a mole basis.

Preferably the composition comprises a filler or plasticiser selected from the group consisting of: calcium chloride and calcium carbonate. Preferably the composition comprises a polysiloxane wetting agent. Preferably the composition is devoid of added conventional and/or commercial photoinitiators. Preferably the composition is a primer, an ink, or an over-print varnish. Preferably the composition has a pH of between 6 and 7.

According to a second aspect, the present invention provides a method of preparing a curable composition comprising a metal salt, the method comprising the steps of: reacting a metal compound with an organic compound, wherein the organic compound comprises an acidic hydrogen and at least one polymerizable unsaturated group, thereby producing the metal salt.

Preferably the metal compound is a metal oxide, a metal carbonate or a metal hydrogen carbonate salt. Preferably the metal compound comprises a metal selected from the group consisting of: aluminium, antimony, barium, calcium, cerium, chromium, cobalt, copper, germanium, indium, iron, lead, magnesium, manganese, mercury, nickel, ruthenium, rhenium, silicon, silver, thallium, tin, titanium, tungsten, vanadium, zirconium and zinc.

Preferably the metal compound comprises a metal selected from the group consisting of: zinc, calcium, titanium, chromium, tin, cerium, vanadium, zirconium and magnesium.

Preferably the metal compound is a metal oxide. Preferably the metal compound is selected from the group consisting of: silicon oxide, aluminium oxide, antimony oxide, calcium oxide, cerium oxide, chromium oxide, copper oxide, germanium oxide, indium oxide, nickel oxide, rhenium oxide, ruthenium oxide, silver oxide, tin oxide, titanium oxide, vanadium oxide, magnesium oxide, zirconium oxide, zinc oxide, and combinations thereof. The metal compound may be photocatalytic. Preferably the metal compound is selected from the group consisting of: cerium oxide, chromium oxide, tin oxide, titanium oxide, vanadium oxide, magnesium oxide, zirconium oxide, and zinc oxide. Preferably the metal compound is zinc oxide or magnesium oxide.

Preferably a molar excess of organic compound is used in the reacting step.

Preferably the organic compound is selected from the group consisting of: unsaturated short chain ($C_3$-$C_5$) fatty acids, and unsaturated medium chain ($C_6$-$C_{12}$) fatty acids, or a combination thereof. Preferably the organic compound is methacrylic acid or acrylic acid.

The method may comprise adding an additional component selected from the group consisting of: a co-monomer, a dye, a pigment, a filler, a wetting agent, and a defoamer or a mixture of any two or more of these.

The method may comprise adding a co-monomer selected from the group consisting of: a molecular form of the organic compound, a sodium salt of the organic compound, or an ammonium salt of the organic compound, e.g., preferably sodium acrylate or ammonium acrylate. For example, the co-monomer may be selected from the group consisting of: acrylic acid, methacrylic acid, sodium acylate, sodium methacrylate, ammonium acrylate and ammonium methacrylate, or a combination of any two or more of these.

The step of reacting may comprise: providing a suspension of metal compound particles in a solvent; and adding the suspension to the organic compound with mixing. Preferably the solvent is water.

The step of reacting may comprise: adding the metal compound to a basic solution; and adding the metal compound in basic solution to the organic compound, with mixing. Preferably the basic solution is an aqueous solution comprising a hydroxide salt. Preferably the hydroxide salt is sodium hydroxide, potassium hydroxide, ammonium hydroxide, or a mixture thereof. Preferably the basic solution has a pH of between about 10 and 14.

Preferably the organic compound and the metal compound react in an acid-base neutralisation reaction. A molar excess (with respect to the metal compound) of organic compound may be used in the reacting step. Preferably the organic compound and the metal compound react to form a mixture having a pH of between 1 and 4. Preferably the method further comprises adjusting the pH of the composition to between 5 and 7. Preferably the pH is adjusted using sodium hydroxide, potassium hydroxide, or ammonium hydroxide, N,N-dimethyl-D-glucamine, aminomethyl propanol, or a mixture thereof.

Preferably the method does not comprise adding a photoinitiator to the composition. Preferably the method further comprises the step of adding a hollow sphere polymeric pigment to the composition. Preferably the method further comprises the step of adding a filler or plasticiser selected from the group consisting of: calcium chloride, calcium carbonate, urea, or a water-soluble salt. Preferably the method further comprises the step of adding a polysiloxane wetting agent. Preferably the curable composition is a primer, an ink or an over-print varnish.

According to a third aspect, the present invention provides a curable composition comprising one or more reaction products produced by reacting a metal compound as defined in the second aspect with an organic compound as defined in the second aspect comprising an acidic hydrogen, wherein the organic compound comprises at least one polymerizable unsaturated group.

According to a fourth aspect, the present invention provides a curable composition comprising one or more reaction products produced by reacting a metal compound as defined in the second aspect with a molar excess of an organic compound as defined in the second aspect comprising an acidic hydrogen, wherein the organic compound comprises at least one polymerizable unsaturated group.

According to a fifth aspect, the present invention provides a curable composition comprising one or more reaction products produced by reacting a metal compound as defined in the second aspect in a basic solution as defined in the second aspect with a molar excess of an organic compound as defined in the second aspect comprising an acidic hydrogen, wherein the organic compound comprises at least one polymerizable unsaturated group.

The reaction products of the fourth and fifth aspects may comprise one or more of the following species: zinc acrylate, zinc methacrylate, magnesium acrylate, magnesium methacrylate, sodium acrylate, sodium methacrylate, ammonium acrylate, ammonium methacrylate, sodium zincate, zinc hydroxide or magnesium hydroxide. The curable compositions of the fourth and fifth aspects may comprise unreacted starting material selected from the group consisting of acrylic acid and methacrylic acid. The reaction products may be produced in aqueous solution. The curable compositions may further comprise an additional component selected from the group consisting of: a dye, a pigment, a filler, a plasticiser, a wetting agent, and a defoamer, or a mixture of any two or more of these.

According to a sixth aspect, the present invention provides a curable composition consisting of one or more reaction products produced by reacting: a metal compound as defined in the second aspect; with a molar excess (with respect to the metal compound) of an organic compound as defined in the second aspect comprising an acidic hydrogen, wherein the organic compound comprises at least one polymerizable unsaturated group, wherein the curable composition is adjusted to a pH of between 5 and 7 by the addition of an aqueous basic solution as defined in the second aspect, wherein the curable composition optionally further consists of a dye, a pigment, a filler, a plasticiser, a wetting agent, or a defoamer, or a mixture of any two or more of these.

According to a seventh aspect, the present invention provides a curable composition consisting of one or more reaction products produced by reacting: a metal compound as defined in the second aspect in a basic solution as defined in the second aspect; with an organic compound as defined in the second aspect comprising an acidic hydrogen, wherein the organic compound comprises at least one polymerizable unsaturated group, wherein the curable composition optionally further consists of a dye, a pigment, a filler, a plasticiser, a wetting agent, a pH adjusting agent, or a defoamer, or a mixture of any two or more of these.

According to an eighth aspect, the present invention provides a curable composition consisting of one or more reaction products produced by reacting: a metal compound as defined in the second aspect in a basic solution as defined in the second aspect; with a molar excess (with respect to the metal compound) of an organic compound as defined in the second aspect comprising an acidic hydrogen, wherein the organic compound comprises at least one polymerizable unsaturated group, wherein the curable composition optionally further consists of a dye, a pigment, a filler, a plasticiser, a wetting agent, a pH adjusting agent, or a defoamer, or a mixture of any two or more of these.

According to a ninth aspect, the present invention provides use of a curable composition according to the first aspect or a curable composition produced by the method of the second aspect as a primer composition. Preferably the primer is devoid of added commercial and/or conventional photoinitiator.

According to a tenth aspect, the present invention provides use of a curable composition according to the first or third to eighth aspects or a curable composition produced by the method of the second aspect as an inkjet or flexographic ink. Preferably the ink is devoid of an added commercial and/or conventional photoinitiator.

According to an eleventh aspect, the present invention provides use of a curable composition according to the first or third to eighth aspects or a curable composition produced by the method of the second aspect as an over-print varnish. Preferably the over-print varnish is devoid of added commercial and/or conventional photoinitiators.

According to a twelfth aspect, the present invention provides a method for priming a substrate, the method comprising the steps of: applying a curable composition according to the first or third to eighth aspects, or a curable composition produced by the method according to the second aspect, onto the substrate; and curing the curable composition to thereby provide a primed substrate.

According to a thirteenth aspect, the present invention provides a method for varnishing a substrate that has been printed, the method comprising the steps of: applying a curable composition according to the first or third to eighth aspects, or a curable composition produced by the method according to the second aspect, onto the substrate; and curing the curable composition to thereby provide a varnished substrate.

Preferably the substrate is a lightweight paper, and the primed substrate has a tensile strength at least 15% greater than the tensile strength of a non-primed substrate. Preferably the applying is by roller or spray bar, although other methods may also be suitable. The applying may be performed on a substrate printed with an uncured (i.e., wet) UV curable offset or flexographic ink or a wet non-UV lithographic or flexo ink.

According to a fourteenth aspect, the present invention provides a method for inkjet or flexo printing on a substrate, the method comprising the steps of: printing a curable composition according to the first or third to eighth aspects onto a substrate; and curing the curable composition to thereby provide a printed substrate. Preferably the substrate comprises a primer layer. The curable composition for printing may comprise an added commercial and/or conventional photoinitiator. Preferably the curing comprises irradiating the composition at room temperature with an EB dose in the range of between 0.1 and 10 Mrad. In such embodiments, the curable compositions are devoid of photoinitiator. Preferably the curing requires less than 35% of the energy required to cure an equivalent conventional EB-curing primer, ink or varnish.

Preferably the curing comprises exposing the composition to UV energy at room temperature. In one embodiment, the UV energy is supplied by a mercury arc UV lamp. In another embodiment, the UV energy is supplied by an LED UV lamp. Preferably the curing is in an atmospheric/air environment. In preferred embodiments, no nitrogen blanket is required for curing.

According to a fifteenth aspect, the present invention provides a printing press comprising: a priming means for applying a primer composition a substrate to be coated; means to cure said primer to produce a primed printable substrate; printing means to print ink onto said primed printable substrate; means to cure said ink to produce a primed and printed substrate; varnishing means for applying a varnish composition to the primed and printed substrate; and means to cure said varnish to produce a primed, printed and coated substrate; wherein at least two, or optionally all three, of the primer composition, the ink, and the varnish composition comprise a curable composition according to the first or third to eighth aspects, or a curable composition produced by the method according to the second aspect.

Preferably the curing means is selected from UV, EB and/or thermal. Preferably the printing means is selected from inkjet, lithographic, flexographic, gravure, dry or liquid toner systems, HP Indigo and Landa Nanographic. Preferably the priming means and varnishing means are independently selected from the group consisting of: gravure, roller coating, anilox, curtain coating, blade coating, spray bar and Mayer bar. Preferably the press is a web-fed press. In another embodiment, the press is a sheet-fed press. Coatings, primers and/or inks for use with the present invention are preferably those as described herein, however, in some embodiments they may be selected from the coatings, primers and/or inks disclosed in WO 2018/076068.

According to a sixteenth aspect, there is provided a printing press comprising: a priming means for applying a primer composition to a low grade or inexpensive substrate to be coated; means to cure said primer to produce a primed high quality printable substrate; printing means to print ink onto said primed printable substrate to produce a printed substrate, wherein the ink is a UV curable offset or flexographic ink or a non-UV lithographic or flexo ink and said ink is not cured prior to varnishing; varnishing means for applying a varnish composition to the printed substrate; and means to cure said varnish to produce a coated substrate; wherein at least the primer composition and the varnish composition comprise a curable composition according to the first or third to eighth aspects, or a curable composition produced by the method according to the second aspect.

BRIEF DESCRIPTION OF THE DRAWINGS

Preferred embodiments of the invention will now be described, by way of example only, with reference to the accompanying drawings in which:

FIG. 3 shows the flow characteristics, expressed as average flow length of an ink measured using the glass plate method for an ink of the present invention in comparison to a standard commercially available UV flexo ink, as described in Example 8.

DEFINITIONS

Figure 1:
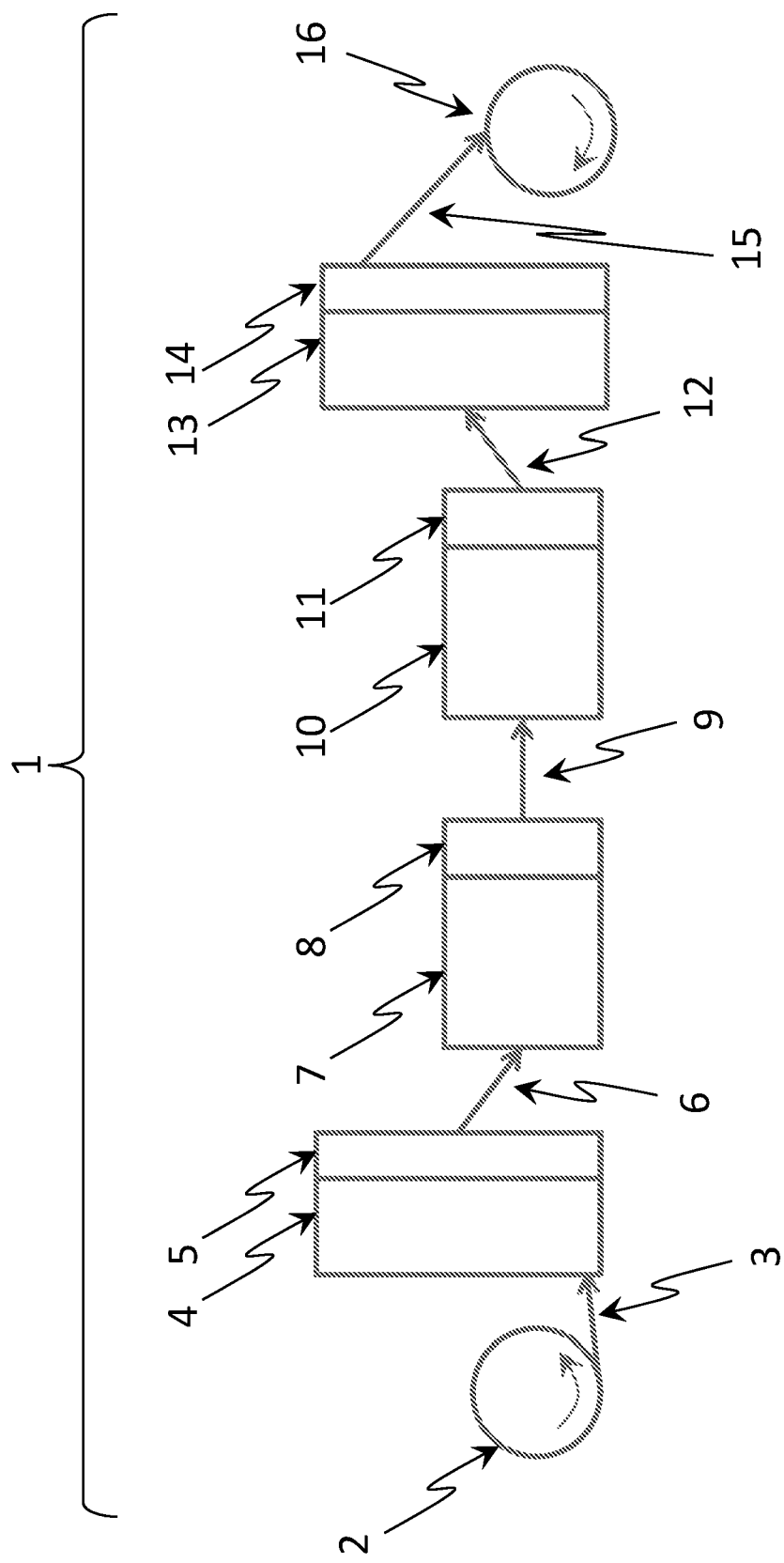
FIG. 1 is a schematic illustration of a web-fed inkjet or flexo press line with radiation curing priming/pre-coating, printing and overprint varnishing which can utilise primers and/or inks and/or varnishes of the present invention.

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

Unless the context clearly requires otherwise, throughout the description and the claims, the words 'comprise', 'comprising', and the like are to be construed in an inclusive sense as opposed to an exclusive or exhaustive sense; that is to say, in the sense of 'including, but not limited to'.

Other than in the operating examples, or where otherwise indicated, all numbers expressing quantities of ingredients or reaction conditions used herein are to be understood as modified in all instances by the term 'about'. The examples are not intended to limit the scope of the invention. In what follows, or where otherwise indicated, '%' will mean 'weight %', 'ratio' will mean 'weight ratio' and 'parts' will mean 'weight parts'.

The term 'substantially' as used herein shall mean comprising more than 50% by weight, where relevant, unless otherwise indicated.

The recitation of a numerical range using endpoints includes all numbers subsumed within that range (e.g., 1 to 5 includes 1, 1.5, 2, 2.75, 3, 3.80, 4, 5, etc.).

The terms 'preferred' and 'preferably' refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein, the term "primer" is understood to refer to a preparatory coating ("pre-coating") or undercoat applied directly to a substrate surface prior to printing. A primer can be pigmented or clear and/or dyed if a substrate requires tinting.

As used herein, the term "ink" is understood to refer to a coloured (i.e., non-colourless) substance applied during printing to produce an image, text or design. Unless the context indicates otherwise, "ink" as used herein may refer to "inkjet ink" or to "flexographic ink".

As used herein, the term "varnish", and related term "overprint varnish" is understood to refer to a protective layer, generally waterproof or water resistant, that is applied over the top of a printed layer to protect the ink from being disturbed on the printed page and/or to provide a more attractive finish for the product e.g., magazine covers or pharmaceutical packaging.

As used herein, the term "coating" is used generally to refer to one or more layers of primer, ink or varnish as the context requires, and includes combinations of layers of primer and ink, or ink and varnish, or primer, ink and varnish, on a substrate where appropriate.

As used herein, viscosity at a given temperature refers to viscosity as measured using a Brookfield RVT Viscometer equipped with Spindle no. 4 and 6 at 20 and 100 rpm.

As used herein in the specification and in the claims section that follows, the term "pigment" refers to a finely divided solid colorant. The pigment may have an organic and/or inorganic composition. Typically, pigments are insoluble in, and essentially physically and chemically unaffected by, the vehicle or medium in which they are incorporated. Pigments may be coloured, fluorescent, or pearlescent. Pigments may alter appearance by selective absorption, interference and/or scattering of light. They are usually incorporated by dispersion in a variety of systems and may retain their crystal or particulate nature throughout the pigmentation process.

As used herein in the specification and in the claims section that follows, the term "dye" refers to at least one coloured substance that is soluble or goes into solution during the application process and imparts colour by selective absorption of light.

As used herein, the term "cure" (and related terms such as "curable") refers to a process whereby monomers (or oligomers) polymerise, and optionally also crosslink, to form an optionally crosslinked polymer. "Curable" thus refers to the property of a monomer or oligomer that it may be polymerised, or be used to crosslink polymer chains, or both.

As used herein, the term "lightweight" or "thin paper" refers to cellulosic material having a weight of 40 g/m² or less.

The prior art referred to herein is fully incorporated herein by reference.

DETAILED DESCRIPTION

The skilled addressee will understand that the invention comprises the embodiments and features disclosed herein as well as all combinations and/or permutations of the disclosed embodiments and features.

The present invention provides a curable composition comprising: a metal salt comprising an anionic form of an organic compound, said organic compound comprising at least one polymerisable unsaturated group and an acidic hydrogen; and water. In some embodiments, the curable composition comprising a metal salt is prepared by reacting a metal compound with an organic compound, wherein the organic compound comprises an acidic hydrogen and at least one polymerizable unsaturated group, thereby producing the metal salt. The curable compositions described herein are particularly useful as primers, inks, or as over-print varnishes.

Metal Salts and Metal Compounds

The metal salt described herein may be formed in-situ by reaction of a pure metal, such as zinc, with the acidic hydrogen of the organic compound. However, such embodiments are generally not preferred due to potentially slow reaction times. Instead, the metal salt herein is preferably prepared in situ by reacting a metal compound with an organic compound, wherein the organic compound comprises an acidic hydrogen and at least one polymerizable unsaturated group. However, it will be appreciated that the metal salt may alternatively be provided to the composition already formed, e.g., in the form of a commercially available salt.

Commercial metal salts useful in the present invention may include: a metal acrylate salt, a metal methacrylate salt, a metal salt of an unsaturated short chain ($C_3$-$C_5$) fatty acid, or a metal salt of an unsaturated medium chain ($C_6$-$C_{12}$) fatty acid, or a metal salt of a long chain ($C_{13}$-$C_{22}$) unsaturated fatty acid. For example, the metal salt may be a metal butenoate, pentenoate, hexenoate, heptenoate, octenoate, nonenoate, decenoate, undecenoate, or dodecenoate salt, or an oleic acid metal salt, a linoleic acid metal salt, etc. The metal in the metal salt may be aluminium, antimony, barium, calcium, cerium, chromium, cobalt, copper, germanium, indium, iron, lead, magnesium, manganese, mercury, nickel, ruthenium, rhenium, silicon, silver, thallium, tin, titanium, tungsten, vanadium, zirconium or zinc. Preferably, the metal is zinc, titanium, chromium, tin, cerium, magnesium, zirconium or vanadium. Most preferably, the metal is zinc or magnesium. In one embodiment, the metal salt is zinc acrylate or zinc methacrylate. In another embodiment, the metal salt is magnesium acrylate or magnesium methacrylate. Preferably, the curable compositions herein comprise a metal salt selected from the group consisting of: zinc acrylate, zinc methacrylate, magnesium acrylate and magnesium methacrylate. Suppliers of metal salts, e.g., magnesium/zinc acrylate or magnesium/zinc methacrylate, may include Sigma Aldrich®, Alfa Aesar®, Cray Valley, etc.

Whether prepared in situ by reacting a metal compound with an organic compound, or provided to the composition already formed, the metal salts as described herein may comprise any suitable metal. For example, the metal may be aluminium, antimony, barium, calcium, cerium, chromium, cobalt, copper, germanium, indium, iron, lead, magnesium, manganese, mercury, nickel, ruthenium, rhenium, silicon, silver, thallium, tin, titanium, tungsten, vanadium, zirconium or zinc. In some embodiments, the metal salt comprises a metal selected from the group consisting of: zinc, titanium, chromium, tin, cerium, and vanadium. For example, the metal salt may comprise zinc, or may comprise titanium, or may comprise chromium, or may comprise tin, or may comprise cerium, or may comprise magnesium, or may comprise zirconium, or may comprise vanadium. The metal salt may be photocatalytic. The metal salt preferably comprises zinc or magnesium. It will be evident that "metal" as used herein may include semi-metals, such as silicon, antimony, and germanium. Suitable counterions for the metal in the metal salt are discussed below in the section entitled "Organic compound". The metal and/or metal salt as used in the compositions herein are, in some embodiments, non-toxic to humans. In other embodiments, the metal and/or metal salt as used in the compositions herein are food safe. The non-toxic and/or food safe nature of the metal and/or metal salt may be an inherent feature of the compounds, or may be related to the concentrations used, or may be related to their final chemical form in the compositions of the invention once cured, or a combination of any two or more of these factors. In some embodiments, where non-toxic and/or food safe metals and/or metal salts are used, other components of the compositions are also selected to be non-toxic and/or food safe. Suitable examples of non-toxic metals may include zinc, magnesium, iron, calcium, etc.

The metal salts of the invention may be present in the curable composition at any suitable solids concentration. However, a solids concentration of from 5 to 90 wt % is preferred. For example, the metal salts may be present in the curable composition at a solids concentration of greater than or equal to 5 wt %, or 10 wt %, or 15 wt %, or 20 wt %, or 25 wt %, or 30 wt %, 35 wt %, or 40 wt %, or 45 wt %, or 50 wt %; or 55 wt %; or 60 wt %; 65 wt %, or 70 wt %, or 75 wt %, or 80 wt %, or 85 wt %, or 90 wt %. The metal salts may be present in the composition at a solids concentration of between 5 and 15 wt %, or of between 10 and 20 wt %, or of between 10 and 60 wt %, or of between 20 and 40 wt %, or of between 15 and 45 wt %, or of between 15 and 60 wt %, or of between 25 and 50 wt %, or of between 40 and 60 wt %, or of between 50 and 75 wt %, or of between 65 and 90 wt %. For example, the metal salts may be present in the composition at a solids concentration of 5 wt %, or 10 wt %, or 15 wt %, 20 wt %, or 25 wt %, or 30 wt %, or 35 wt %, or 40 wt %, or 45 wt %, or 50 wt %; or 55 wt %; or 60 wt %; 65 wt %, or 70 wt %, or 75 wt %, or 80 wt %, or 85 wt %, or 90 wt %. In a particular aspect, the present invention provides a composition comprising: 30 wt % to 45 wt % of metal salts; and 10 wt % to 35 wt % water. In one embodiment the metal salts of the invention are present at between 15 and 45 wt % of the composition.

The metal salts of the invention may have a solubility in water of greater than 5 g/L, 10 g/L, 20 g/L, 50 g/L, 100 g/L, 250 g/L, 500 g/L, or 1000 g/L at 25° C. at a pH of between 5-9. Preferably, the metal salts have a solubility of at least 40 g/L. The metal salts of the present invention are preferably fully miscible with water. The metal salts of the present invention are preferably fully miscible with water at temperatures of between 20 and 35° C., or at a temperature of 25° C.

The metal salts of the present invention may have a surface tension of around 50 milliNewton/m (mN/m) at least one temperature in the range of 20-60° C.

In some embodiments, the metal salt is prepared in situ by reacting a metal compound with an organic compound, wherein the organic compound comprises an acidic hydrogen and at least one polymerizable unsaturated group. By "in situ" it is meant that the metal compound and organic compound are reacted together and the resultant mixture used as the composition base (in which optionally one or more additional components may be added). The metal compound may be any suitable metal compound. The metal compound is preferably selected such that it reacts with the selected organic compound in an acid-base reaction. However, the skilled person will be aware of other chemical reactions by which a metal salt may be formed with an organic compound as described herein, e.g., by ion exchange, etc. The metal compound may be provided in any suitable form. For example, the metal compound may be provided in the form of a metal oxide, a metal carbonate or a metal hydrogen carbonate salt. Preferably, the metal compound is a metal oxide. In some embodiments, the metal oxide is an amphoteric metal oxide, such as zinc oxide. The metal compound may comprise a metal such as aluminium, antimony, barium, calcium, cerium, chromium, cobalt, copper, germanium, indium, iron, lead, magnesium, manganese, mercury, nickel, ruthenium, rhenium, silicon, silver, thallium, tin, titanium, tungsten, vanadium, zirconium or zinc. Preferably, the metal compound comprises a metal such as zinc, titanium, chromium, tin, cerium, magnesium, zirconium or vanadium. Most preferably, the metal compound comprises zinc or magnesium. Accordingly, the metal compound may be, for example, silicon oxide, aluminium oxide, antimony oxide, calcium oxide, cerium oxide, chromium oxide, copper oxide, germanium oxide, indium oxide, nickel oxide, rhenium oxide, ruthenium oxide, silver oxide, tin oxide, titanium oxide, vanadium oxide, magnesium oxide, zirconium oxide or zinc oxide, or a combination of any two or more of these. For example, the metal compound may be selected from the group consisting of cerium oxide, chromium oxide, tin oxide, titanium oxide, vanadium oxide, magnesium oxide, zirconium oxide and zinc oxide. Preferably, the metal compound is zinc oxide or magnesium oxide. In some embodiments, the acidic organic compound and zinc/magnesium oxide form a stable salt or complex in aqueous, non-aqueous, low pH, high pH, high temperature, low temperature, humid, and dry storage environments. The metal compound may be photocatalytic. The metal compound may be a compound of a single metal or may be a compound of an alloy of two or more metals. In one embodiment, the curable compositions described herein comprise one or more reaction products produced by reacting a metal compound as defined in this section entitled "Metals salts and metal compounds" with an organic compound as defined in the section below entitled "Organic compound". The reaction products preferably include metal salts of the kind described herein.

The metal compound, which in certain embodiments is a metal oxide, may have an average particle diameter of between 0.001 and 100 µm, e.g., of between 0.001 and 0.01 µm, or between 0.01 and 0.1 µm, or between 0.1 and 1 µm, or between 0.001 and 1 µm, or between 0.01 and 0.5 µm, or between 0.1 and 0.2 µm, or between 0.1 and 0.5 µm, or between 1 and 10 µm, or between 10 and 50 µm, or between 25 and 75 µm, or between 50 and 100 µm, or between 75 and 100 µm, e.g., 0.001, 0.01, 0.1, 0.2, 0.5, 1.0, 2, 5, 10, 20, 50, 75 or 100 µm. In some embodiments, surfactants may be added to the solvent to improve dispersibility of the metal compound, e.g., metal oxide, particles.

The shape of the metal compound, e.g., metal oxide, particles may be globular, hollow, porous, rod-like, plate-like, fibrous, or amorphous. The specific surface area of the particles determined by the BET method using nitrogen may be 10 to 1000 $m^2/g$, e.g., 100 to 500 $m^2/g$. The metal compound particles can be used either in the form of a dry powder or a dispersion in water or an organic solvent, or a mixture thereof.

Preferably, the metal compound reacts completely or near completely with the organic compound in an acid-base reaction such that a metal salt is formed comprising an anionic form of the organic compound. For example, where the metal compound comprises a metal in the 2+ oxidation state, and the organic compound comprises a single acidic hydrogen, the metal salt formed on reaction between the metal compound and organic compound may have a 1:2 molar ratio of metal cation to organic compound anion. More generally, the metal compound may react to form, or the metal salt may be, a metal-organic complex with one or more molecules of organic compound. For example, the metal may be complexed with one, two, three, or more molecules of organic compound. In some embodiments, the metal is complexed with two molecules of organic compound. For example, metal may complex with two acrylic acid molecules to form a metal diacrylate salt or metal diacrylic acid complex. Although the term "metal salt" is used herein, this term is not intended to exclude metal-organic complexes or other metal-organic ion-paired species that may form. Indeed, although the term "metal salt" is used herein, it will be understood that the reaction product of a metal compound and organic compound as described herein may be more complex than a simple binary salt, and should therefore be considered to include metal complexes, including metal complex clusters, ladders, or other supramolecular-type structures, where the constituent components include one or more metal ions bound to or associated with one or more organic compound ions.

In one preferred embodiment, the metal compound is zinc oxide (ZnO), the organic compound is methacrylic acid or acrylic acid, and the metal salt formed is zinc methacrylate or zinc acrylate (respectively). In another preferred embodiment, the metal compound is magnesium oxide (MgO), the organic compound is methacrylic acid or acrylic acid, and the metal salt formed is magnesium methacrylate or magnesium acrylate (respectively).

The metal compounds of the invention may be reacted with an organic compound under any suitable conditions to effect formation of a metal salt. Preferably, the metal compounds and organic compounds are reacted with each other with no further solvent or heat; however, in some embodiments, (co-)solvent(s), heat, pH adjusting agents, catalysts, etc. may be required. In some embodiments, excess organic compound may act as a solvent and/or co-solvent. The amount of metal compound reacted can be adjusted depending on the final metal salt solids loading desired, but by way of non-limiting example, may generally be in the order of from 1 to 50 wt %. For example, the concentration of metal compound used to make the metal salt in the composition may be greater than or equal to 1 wt %, 5 wt %, 10 wt %, 15 wt %, 20 wt %, 25 wt %, 30 wt %, 35 wt %, 40 wt %, 45 wt %, or 50 wt %, or between 1 and 25 wt %, or between 5 and 15 wt %, or between 10 and 20 wt %, or between 10 and 40 wt %, or between 20 and 40 wt %, or between 25 and 50 wt %, or between 40 and 50 wt %. For example, the metal compound may be added at a solids concentration of 1 wt %, 2 wt %, 5 wt %, 8 wt %, 10 wt %, 12 wt %, 15 wt %, 18 wt %, 20 wt %, 25 wt %, 30 wt %, 35 wt %, 40 wt %, 45 wt %, or 50 wt %.

The metal salts of the present invention are curable. The metal salts and reaction products described herein may be curable by UV or electron beam (EB) radiation, or by IR radiation. In preferred embodiments, the metal salts and reaction products are curable by application of UV or EB, and do not require pre-treatment with IR or heat. The metal salts in the curable compositions of the invention can thus be exposed to UV and/or EB energy to form a cured coating. In some embodiments, the coating is substantially transparent at visible wavelengths. Metal salts as described herein may be UV-radiation curable in the absence of a photoinitiator. Metal salts as described herein may be curable, especially EB-curable, in the absence of an inert atmosphere. Compositions as described herein comprising zinc acrylate, zinc methacrylate, magnesium acrylate or magnesium methacrylate, for example, can be cured with, or in the absence of, an inert atmosphere, with no difference in the cured film characteristics.

Organic Compound

As disclosed herein, the organic compound comprises at least one polymerisable unsaturated group and an acidic hydrogen. The polymerisable group is preferably a vinyl group (C═C), but other polymerisable groups, such as alkyne groups and nitrile groups, may also be suitable. The term "acidic hydrogen" refers to a hydrogen attached to an electronegative atom such as O, F, etc.

The organic compound may be an organic acid. Preferably, the acidic hydrogen in the organic compounds herein is attached to an O atom. More preferably, the acidic hydrogen is part of a —COOH functional group, and accordingly, the organic compound as described herein thus contains at least one carboxylic acid group. For example, the organic compound herein may contain one carboxylic acid group, or may contain two carboxylic acid groups (a dicarboxylic acid), or may contain three or more carboxylic acid groups. Where a carboxylic acid functionality is present in the organic compound, the anionic form of the organic compound will comprise a carboxylate group. In one embodiment, the carboxylate group is part of an acrylate or methacrylate anion.

The organic compound herein may, for example, be an unsaturated short chain ($C_3$-$C_5$) fatty acid, or may be an unsaturated medium chain ($C_6$-$C_{12}$) fatty acid, or may be a long chain ($C_{13}$-$C_{22}$) unsaturated fatty acid. For example, the organic compound comprising an acidic hydrogen may be a straight-chain polyunsaturated olefinic carboxylic acid, such as, for example, linoleic acid, linolenic acid, retinoic acid, or an omega-3 fatty acid. In some embodiments, the organic compound comprising an acidic hydrogen is an aliphatic alpha-hydroxy acid, an aliphatic beta-hydroxy acid, an aliphatic delta-hydroxy acid, or an aliphatic gamma-hydroxy acid. Suitable monounsaturated short chain fatty acids may include propenoic acid (acrylic acid), 2-butenoic acid (methacrylic acid), 3-butenoic acid, and pentenoic acid (any isomer, e.g., 2-, 3-, 4-, iso-). Suitable monounsaturated medium chain fatty acids may include the various isomers of hexenoic acid, heptenoic acid, octenoic acid, nonenoic acid, decenoic acid, undecenoic acid and dodecenoic acid. Unsaturated fatty acids having two or more vinyl groups (i.e., diunsaturated, triunsaturated, polyunsaturated etc.) per molecule may also be suitable. The monounsaturated fatty acids described herein may be cis- or trans-isomers, or in the case of di-, tri- or polyunsaturated fatty acids, may be cis-, trans- or a mixture of cis- and trans-isomers. Other fatty acids may also be suitable, e.g., unsaturated $C_{13}$-$C_{22}$ fatty acids, such as oleic acid, linoleic acid, etc. Other organic compounds, such as abietic acid may also be suitable. Preferably, the organic compound herein is methacrylic acid or acrylic acid.

Organic compounds comprising 2 or more unsaturated groups per molecule are foreshadowed by the present invention. Organic compounds comprising 2 or more carboxylic acid groups per molecule are foreshadowed by the present invention. Organic compounds comprising 2 or more carboxylic acid groups and 2 or more unsaturated groups per molecule are foreshadowed by the present invention.

The organic compound may alternatively be a water-soluble (meth)acrylate of formula $CH_2$═$C(R^1)$—$R^2$—$C(═O)OH$, wherein $R^1$ is —H, methyl, ethyl, or —OH, and $R^2$ is a direct bond, or is a linear, branched, or cyclic $C_1$-$C_8$ alkyl or alkenyl or aromatic group.

In some embodiments, $R^2$ is methyl, ethyl, propyl, isopropyl, butyl, isobutyl, pentyl, cyclopentyl, 2-methylbutyl, hexyl, 2,3-dimethylbutyl, 3-methylpentyl, cyclohexyl, heptyl, octyl, 3-ethyl-2-methylpentyl, etc.

The organic compound for use in the present invention is preferably partially or completely water soluble or is water miscible.

It is contemplated that the methods disclosed herein can be used to form a metal salt comprising metal that is bound covalently or ionically to an organic compound having an acidic hydrogen and one or more polymerizable unsaturated groups.

In other embodiments, the curable compositions described herein comprise one or more reaction products produced by reacting a metal compound as defined in the section above entitled "Metals salts and metal compounds" with an organic compound as defined in this section entitled "Organic compound". The reaction products preferably include metal salts of the kind described herein, as further described below in the section entitled "Reaction products".

The amount of organic compound included in the compositions of the invention may be any suitable amount. Preferably, a molar excess of organic compound (with respect to metal compound) is included in the composition when the metal salt is formed in situ. For example, where the molar ratio of organic compound to metal compound based on the acid-base neutralisation reaction is 2:1 in the case of a metal 2+ ion and a (mono)carboxylic acid organic compound, the molar ratio of organic compound to metal compound added to the composition may be at least 2.25:1, at least 2.5:1, or at least 2.75:1, or at least 3:1, or at least 3.25:1, or at least 3.5:1, or at least 3.75:1, or at least 4:1, or at least 5:1, or at least 7.5:1, or at least 10:1, or between 2.25:1 and 4:1, or between 2.5:1 and 3.5:1, or between 3:1 and 4:1, or between 3:1 and 6:1, or between 5:1 and 10:1, or between 2.25:1 and 10:1, or between 2.5:1 and 10:1, e.g., may be 2.25:1, 2.5:1, 2.75:1, 3:1, 3.25:1, 3.5:1, 3.75:1, 4:1, 5:1, 6:1, 7:1, 8:1, 9:1, or 10:1. Ratios for metal ions having other oxidation states and/or for di-, tri- or poly-carboxylic acids may be proportionally varied from these ratios for 2+ ions. Any excess (unreacted) organic compound added in this manner may be considered a co-monomer as described in the following section entitled "Co-monomers". However, included within the scope of the present inventions are compositions having a molar ratio of organic compound to metal compound of less than 2.25:1, e.g., of less than 2:1, of less than 1.75:1, of less than 1.5:1, etc., e.g., or between 1.5:1 and 1:1, or between 2:1 and 3.5:1, or between 1.75:1 and 5:1, e.g., a ratio of 1.5:1, 1.75:1, or 2:1 may be suitable.

In instances where the metal salt is not formed in-situ, but added to the composition as a pre-formed salt, excess organic compound may be added to the composition as a co-monomer as described in the following section entitled "Co-monomers" so as to achieve the ratios indicated in this paragraph.

By way of non-limiting example, the amount of organic compound included in the composition may be greater than or equal to 5 wt %, or 10 wt %, or 15 wt %, or 20 wt %, or 25 wt %, or 30 wt %, 35 wt %, or 40 wt %, or 45 wt %, or 50 wt %; or 55 wt %; or 60 wt %; 65 wt %, or 70 wt %, or 75 wt %, or 80 wt %, e.g., of between 5 and 25 wt %, or of between 10 and 60 wt %, or of between 20 and 40 wt %, or of between 25 and 50 wt %, or of between 40 and 60 wt %, or of between 50 and 75 wt %, or of between 65 and 80 wt %. For example, the organic compound may be present in the composition at a solids concentration of 5 wt %, or 10 wt %, or 15 wt %, 20 wt %, or 25 wt %, or 30 wt %, or 35 wt %, or 40 wt %, or 45 wt %, or 50 wt %; or 55 wt %; or 60 wt %; 65 wt %, or 70 wt %, or 75 wt %, or 80 wt %.

Reaction Products

The curable compositions described herein may comprise one or more reaction products produced by reacting a metal compound as defined in the section above entitled "Metals salts and metal compounds" with an organic compound as defined in this section entitled "Organic compound". The reaction products preferably include metal salts of the kind described herein.

For example, the curable compositions described herein may comprise one or more reaction products produced by reacting a metal compound with a molar excess of an organic compound comprising an acidic hydrogen, wherein the organic compound comprises at least one polymerizable unsaturated group. The molar excess of organic compound may advantageously control the pH of the composition, and/or act as a co-monomer during polymerisation. Any suitable molar ratio of organic compound to metal salt may be used, e.g., between about 5:1 and 2:1, e.g., 4:1 or 3:1.

The curable compositions described herein may comprise one or more reaction products produced by reacting a metal compound in a basic solution, e.g., an aqueous solution of sodium hydroxide having a pH of between 12 and 14, with a molar excess of an organic compound comprising an acidic hydrogen, wherein the organic compound comprises at least one polymerizable unsaturated group.

The reaction products produced by the reaction of preferred metal compounds such as magnesium and zinc oxide with preferred organic compounds such as methacrylic or acrylic acid, and the aqueous base components (such as water and sodium hydroxide) may comprise one or more of the following species: zinc acrylate, zinc methacrylate, magnesium acrylate, magnesium methacrylate, sodium acrylate, sodium methacrylate, ammonium acrylate, ammonium methacrylate, sodium zincate, zinc hydroxide or magnesium hydroxide. The reaction products may comprise unreacted starting material selected from the group consisting of acrylic acid and methacrylic acid. The reaction products of the final compositions will be formed in an aqueous solution, although certain steps of the methods en route to the final composition may be devoid of water/aqueous base.

In some embodiments, the curable compositions herein consist of one or more reaction products produced by reacting: a metal compound; with a molar excess (with respect to the metal compound) of an organic compound comprising an acidic hydrogen, wherein the organic compound comprises at least one polymerizable unsaturated group, wherein the curable composition is adjusted to a pH of between 5 and 7 by the addition of an aqueous basic solution, wherein the curable composition optionally further consists of a dye, a pigment, a filler, a plasticiser, a wetting agent, or a defoamer, or a mixture of any two or more of these. For example, the curable compositions herein may consist of a metal salt, unreacted starting material, other reaction products (including metal hydroxides, other complexes, other salts), water, and optionally a dye, a pigment, a filler, a plasticiser, a wetting agent, or a defoamer. Such compositions will be understood to be devoid of added commercial/conventional photoinitiators.

Similarly, the curable compositions herein may consist of one or more reaction products produced by reacting: a metal compound in a basic solution; with an organic compound comprising an acidic hydrogen, wherein the organic compound comprises at least one polymerizable unsaturated group, wherein the curable composition optionally further consists of a dye, a pigment, a filler, a plasticiser, a wetting agent, a pH adjusting agent, or a defoamer, or a mixture of any two or more of these. Still further, the curable compositions herein may consist of one or more reaction products produced by reacting: a metal compound in a basic solution; with a molar excess (with respect to the metal compound) of an organic compound comprising an acidic hydrogen, wherein the organic compound comprises at least one polymerizable unsaturated group, wherein the curable composition optionally further consists of a dye, a pigment, a filler, a plasticiser, a wetting agent, a pH adjusting agent, or a defoamer, or a mixture of any two or more of these.

Additional Components

The compositions described herein may be formulated for specific application as a primer, ink or varnish. The skilled person will be aware that primers, inks and varnishes may comprise different components according to the application method, curing mechanism and function. Accordingly, compositions of the present invention may include any one or more of the following additional components: co-monomer, dye, pigment, photoinitiator, thermal initiator, levelling/wetting agent, surfactant/surface control additive, defoamers, wetting aids, slip agents, biocides, stabilizers, fillers, rheological aids, pH modifiers, optical brighteners, adhesives, plasticiser, co-solvent, etc. For example, the composition may comprise an additional component selected from the group consisting of: a co-monomer, a dye, a pigment, a filler, a wetting agent, and a defoamer, or a mixture of any two or more of these.

For example:
- compositions, when formulated as primers, may be clear, or may be pigmented or contain a dye if the primer is to be used to tint the substrate prior to printing;
- compositions, when formulated as inks, will comprise a dye, or a pigment, or in some embodiments, will comprise a dye and a pigment and will be formulated to have different viscosities suitable for inkjet or flexo printing;
- compositions, when formulated as varnishes, may be clear or comprise dyes and/or pigments if the substrate requires tinting. For example, a yellow coloured varnish on top of an aluminium, metallised or coloured substrate may produce a gold finish;
- primers, inks and varnishes for EB curing will be devoid of photoinitiator, polymerisation catalyst and/or thermal initiator;
- primers, inks and varnishes for UV curing will generally be devoid of photoinitiator, polymerisation catalyst and/or thermal initiator, as the compositions herein may be cured without photoinitiator, using UV or LED-UV sources;

inkjet inks having lowered viscosities, and hence lower solids concentrations of polymerisable components such as metal salts and/or co-monomers, may be formulated with an appropriate photoinitiator or polymerisation catalyst if necessary.

Co-Monomers

In addition to the metal salt, which comprises an anionic form of an organic compound comprising at least one polymerisable unsaturated group, the curable compositions of the present invention may comprise a co-monomer (or co-oligomer). The co-monomer is preferably the same organic compound as used to make the metal salt, but may be an organic compound as described herein in the section above entitled "Organic compound" that is different to the organic compound in the metal salt. In one embodiment, the co-monomer is selected from the group consisting of: a molecular form of the organic compound in the metal salt, a sodium salt of the organic compound in the metal salt, or an ammonium salt of the organic compound in the metal salt. The co-monomer may be in the form of an organic compound as described herein in molecular form, or may be in the form of an anion in a salt comprising a metal as described herein, or another metal such as sodium, potassium, calcium, magnesium, or may be in the form of an ammonium salt. Preferably, the co-monomer is methacrylic acid, or acrylic acid, or an unsaturated short chain ($C_3$-$C_5$) fatty acid, or an unsaturated medium chain ($C_6$-$C_{12}$) fatty acid, or a long chain ($C_{13}$-$C_{22}$) unsaturated fatty acid, or a salt thereof, such as a sodium, potassium, calcium, magnesium, or an ammonium salt thereof. In one embodiment, the co-monomer is a sodium, potassium, calcium, magnesium, or an ammonium salt of methacrylic acid or acrylic acid. For example, the co-monomer may be sodium acrylate, or it may be ammonium acrylate, or it may be a combination of sodium and ammonium acrylate. The preferred co-monomer is sodium acrylate. In another embodiment, the co-monomer is methacrylic acid or acrylic acid. In some embodiments, two or more different co-monomers as described in this paragraph, or in this section entitled "Co-monomers", may be used. For example, the co-monomer may be selected from the group consisting of: acrylic acid, methacrylic acid, sodium acrylate, sodium methacrylate, ammonium acrylate and ammonium methacrylate, or a combination of any two or more of these.

The co-monomer is not limited to being an organic compound as described in the preceding section entitled "Organic compound", but may instead (or additionally) be one or more of the following: hydroxy acrylates (2-hydroxyethyl acrylate, 2-hydroxypropyl acrylate, 4-hydroxybutyl acrylate), alkyls, alicyclic acrylates (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethyleneglycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropyl acrylamide, N,N-dimethylacrylamide, acryloylmorpholine, N-isopropylacrylamide, N,N-diethylacrylamide, N-vinylpyrrolidone, 2-(perfluorooctyl) ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethylacrylate), 2-ethylhexyl acrylate, acrylated methylol urea and methylol melamine (meth)acrylate, cyclic lactams such as N-vinyl caprolactam, N-vinyl oxazolidinone and N-vinyl pyrrolidone, secondary or tertiary acrylamides such as acryloyl morpholine, diacetone acrylamide, N-methyl acrylamide, N-ethyl acrylamide N-isopropyl acrylamide, N-t-butyl acrylamide, N-hexyl acrylamide, N-cyclohexyl acrylamide, N-octyl acrylamide, N-t-octyl acrylamide, N-dodecyl acrylamide, N-benzyl acrylamide, N-(hydroxymethyl)acrylamide, N-isobutoxymethyl acrylamide, N-butoxymethyl acrylamide, N,N-dimethyl acrylamide, N,N-diethyl acrylamide, N,N-propyl acrylamide, N,N-dibutyl acrylamide, N,N-dihexyl acrylamide, N,N-dimethylamino methyl acrylamide, N,N-dimethylamino ethyl acrylamide, N,N-dimethylamino propyl acrylamide, N,N-dimethylamino hexyl acrylamide, N,N-diethylamino methyl acrylamide, N,N-diethylamino ethyl acrylamide, N,N-diethylamino propyl acrylamide, N,N-dimethylamino hexyl acrylamide, and N,N'-methylenebisacrylamide, hydroxyalkyl functionalised melamine acrylate, hydroxyalkyl functionalised acrylated urea, and the like.

The solids concentration of co-monomer in the composition may be any suitable concentration, e.g., up to 5 wt %, 10 wt %, 15 wt %, 20 wt %, or 25 wt %, or 30 wt %, 35 wt %, or 40 wt %, or 45 wt %, or 50 wt %, or between about 0 to 50 wt %, e.g., between 0 and 5%, 5 to 10%, 5 to 35%, 10 to 15%, 10 to 25%, 10 to 40%, 15 to 20%, 20 to 25%, 25 to 30%, 20 to 30%, 30 to 35%, 35 to 40%, or 40 to 50 wt %. For example, the co-monomer may be present in the composition at a solids concentration of 5 wt %, or 10 wt %, or 15 wt %, 20 wt %, or 25 wt %, or 30 wt %, or 35 wt %, or 40 wt %, or 45 wt %, or 50 wt %. In a particular aspect, the present invention provides a composition comprising: 30 wt % to 45 wt % of metal salts, 10 wt % to 35 wt % water, and 5 wt % to 35 wt % co-monomer.

The composition may comprise co-monomer in an amount such that there is at least 2%, or at least 5%, or at least 10% or at least 20%, or at least 50%, or at least 100%, or at least 150%, or at least 200%, or at least 250%, or at least 300%, or at least 400%, or at least 500% more co-monomer in the composition than metal salt on a mole basis, e.g., between 2 and 100% more co-monomer, or between 10 and 150% more, or between 50 and 200% more, or between 50 and 400% more, or between 100 and 200% more, or between 100 and 150% more, or between 200 and 400% more, or between 500 and 1000% more, or between 250 and 500% more, or between 2 and 1000% more, e.g., 2%, 5%, 10%, 20%, 50%, 100%, 150%, 200%, 250%, or 300%, 400%, 500%, 750% or 1000% more co-monomer than metal salt on a mole basis (i.e., $moles_{co-monomer}/moles_{metal\ salt} * 100$).

Dyes

The compositions as described herein may include a dye. Any suitable dye may be used. Suitable dyes for use in the compositions of the present invention may include: Duasyn Yellow 3GF-SF liquid, Duasyn Acid Yellow XX-SF, Duasyn Red 3B-SF liquid, Duasynjet Cyan FRL-SF liquid (all manufactured by Clariant); Basovit Yellow 133, Fastusol Yellow 30 L, Basacid Red 495, Basacid Red 510 Liquid, Basacid Blue 762 Liquid, Basacid Black X34 Liquid, Basacid Black X38 Liquid, Basacid Black X40 Liquid, Basonyl Red 485, Basonyl Blue 636 (all manufactured by BASF). The dye may be present in any suitable concentration. For example, the dye may be present at a concentration of 0.01 to 10 wt %.

Pigments

The compositions as described herein may include a pigment or a mixture of pigments. Any suitable pigment(s) may be used. The pigments may be colour pigments. The pigments may be filler/extender pigments. Suitable pigments for use in the compositions of the present invention may include: organic or inorganic pigments such as carbon black, metal oxides such as zinc oxide, titanium dioxide, zirconia, tin oxide, alumina and other aluminium oxides, calcium oxide, and magnesium oxide, kaolin, calcium carbonate, limestone, barium sulfate (baryte), clay, mica, silica, an aluminosilicate (such as silica-deficient sodium-potassium alumina silicate sold by Minex® under the name Minex® 7), phthalocyanine, anthraquinones, perylenes, carbazoles, monoazo and di sazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. Polymer-based pigments, including hollow sphere polymeric pigments such as manufactured under the name Ropaque® (Dow®; hollow sphere polymeric pigment, 30% solids) or Celocor® (Arkema®; voided latex material, 30% solids), etc. may also be suitable. Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156 PY175, PY180 and PY213; orange pigments P05, P015, P016, P031, P034, P036, P043, P048, P060, P061 and P071; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

In some embodiments, the average particle size ($D_{50}$) of the at least one pigment is not more than 120 nm, not more than 110 nm, not more than 100 nm, not more than 90 nm, not more than 80 nm, not more than 70 nm, not more than 65 nm, or not more than 60 nm. In some embodiments, the average particle size ($D_{50}$) of the pigment is at least 20 nm, at least 25 nm, at least 30 nm, at least 35 nm, at least 40 nm, at least 45 nm, at least 50 nm, at least 55 nm, at least 60 nm, at least 65 nm, or at least 70 nm. In various embodiments, the average particle size ($D_{50}$) of the pigment is in the range of 20-120 nm, in the range of 20-110 nm, in the range of 20-100 nm, in the range of 20-90 nm, in the range of 20-80 nm, in the range of 20-70 nm, in the range of 30-120 nm, in the range of 30-110 nm, in the range of 30-100 nm, in the range of 30-90 nm, in the range of 30-80 nm, in the range of 30-70 nm, in the range of 35-120 nm, in the range of 35-110 nm, in the range of 35-100 nm, in the range of 35-90 nm, in the range of 35-80 nm, in the range of 35-70 nm, in the range of 40-120 nm, in the range of 40-110 nm, in the range of 40-100 nm, in the range of 40-90 nm, in the range of 40-80 nm, or in the range of 40-70 nm.

The pigment or mixture of pigments may be present in any suitable concentration. For example, the pigment may be present in the composition at a solids concentration of between 0.01 and 60 wt %, or between about 1 and 10 wt %, or between about 10 and 20 wt %, or between about 10 and 25 wt %, or between about 15 and 30 wt %, or between about 25 and 40 wt %, or between about 40 and 60 wt %, or of about 0.01, 0.5, 1, 2, 5, 10, 15, 20, 25, 30, 40 50 or 60 wt %. In some embodiments, the compositions of the invention, when substantially cured, contain at least 1.2 wt. %, at least 1.5 wt. %, at least 2 wt. %, at least 3 wt. %, at least 4 wt. %, at least 6 wt. %, at least 8 wt. %, at least 10 wt. %, at least 15 wt. %, at least 20 wt. %, at least 25 wt. % or at least 30 wt. % of the dye and/or pigment.

The compositions as described herein, particularly when formulated as inks, may include a dye and a pigment. As colourants, dyes and pigments have significantly different characteristics hence create different properties in the finished ink. For instance, dye-based inks are generally more transparent, which results in more "pure" colour with higher vibrancy. Inkjet inks made from dyes are generally less expensive due to the dyes being about 50% of the cost of pigments. The cost of the latter is due to the machine processing required to grind the pigments to a nanoparticle size. By comparison, pigment inks generally have greater colour strength or density and when dried have been historically less water-soluble and more fade resistant by comparison with dye-based inks. In addition, they create higher resolution in printing due to the sharpness of the dots formed by the ink droplets. The use of dye-based inks in inkjet printing is to be preferred from a fluid mechanics perspective in that the dyes exist at the molecular level and therefore avoid the problem of inkjet clogging which has been, and remains, a problem for some pigment-based inkjet ink systems. Overall, the ability to create a dual-colourant inkjet ink allows the combination of some of the advantages of pigment inks whilst maintaining the relatively low-cost and preferable fluid mechanics of dye inks. To the best of the Applicant's knowledge, combining pigment and dye-based colourants in the same ink has not previously been achievable. The Applicant postulates that conventional water-based inkjet inks, with water contents in the range 75% to 95% are susceptible to phase separation of the dye and pigment.

Photo Initiators

Compositions of the present invention may be formulated as primers, inks and varnishes. In each of these functions, compositions of the invention preferably do not comprise an added commercial or conventional photoinitiator, thermal initiator or polymerisation catalyst.

In some embodiments, compositions of the invention do not comprise a commercial photoinitiator, thermal initiator or polymerisation catalyst, where the term "commercial" means a compound or composition sold or marketed or used as an additive for performing the specified function (i.e., photoinitiator, thermal initiator, polymerisation catalyst), e.g., commercial photoinitiators include Irgacure® products.

In other embodiments, compositions of the invention do not comprise an added conventional photoinitiator, thermal initiator or polymerisation catalyst, where the term "conventional" means that it is selected from the commercial or non-commercial examples of photoinitiators, thermal initiators or polymerisation catalysts listed in this section entitled "Photoinitiators".

When formulated for EB curing, the compositions described herein will be devoid of added commercial and/or conventional photoinitiators, thermal initiators and polymerisation catalysts. When formulated for UV curing, primer and varnish compositions herein will be devoid of added commercial and/or conventional photoinitiators, thermal initiators and polymerisation catalysts. Generally, inks formulated for UV curing will also be devoid of added commercial and/or conventional photoinitiators, thermal initiators and polymerisation catalysts. However, in certain embodiments, inkjet or flexographic inks may comprise one or more commercial or conventional photoinitiators, thermal initiators or polymerisation catalysts if the concentration of polymerisable components (metal salts and/or co-monomers) is below a curing threshold as a result of viscosity adjustment. Compositions of the present invention, including inks, may be UV curable without added commercial and/or conventional photoinitiator, thermal initiator or polymerisation catalyst when a suitable UV source is used, even after viscosity adjustment. Thermal initiators, such as heat-activated polymerisation catalysts, may be included where the compositions are to be cured by conventional IR radiation.

Where present, any suitable added commercial and/or conventional photoinitiator may be used. The skilled person will be aware of the various added commercial and/or conventional photoinitiators suitable for different radiation sources, such as those designed for use with LED-UV sources, mercury-arc UV sources, etc. For example, the added commercial and/or conventional photoinitiator may be a free radical photoinitiator or may be a cationic photoinitiator. Preferably, if used, the added commercial and/or conventional photoinitiator is a cationic photoinitiator.

Suitable added commercial and/or conventional photoinitiators may include: thioxanthones, phosphine oxide compounds, alpha-hydroxy ketones, benzophenones, aminobenzoates, alpha-aminoalkylphenones, benzoin ethers and benzyl ketals. Any blend of photoinitiators may be used in the compositions of this invention, and include, but are not limited to, those types able to generate free radicals on irradiation such as benzophenone, 1-hydroxycyclohexyl phenyl ketone, 2-benzyl-2-dimethylamino-(4-morpholinophenyl)butan-1-one, diphenyl-(2,4,6-trimethylbenzoyl) phosphine oxide, phenyl bis(2,4,6-trimethylbenzoyl)phosphine oxide, 2,4,6-trimethylbenzoyl-diphenyl-phosphineoxide (TPO), bis(2,6-dimethylbenzoyl)-2,4,4-trimethyl pentylphosphine oxide, 2-hydroxy-2-methyl-1-phenyl-1-propanone, bisacylphosphine oxide (BAPO), isopropylthioxanthone, diethylthioxanthone, diester of 2-carboxymethoxy thioxanthone and poly tetramethyleneglycol 250. Other examples of suitable free-radical photo-initiators include Irgacure® 2959, 184, 651, 750, 500, 127, 1700, 1800, 819 (Ciba Specialty Chemicals), Darocur® TPO, 1173 etc. Other suitable free-radical initiators with appropriate solubility in the curable material/solvent mixture will be well-known to those skilled in the art, as will be suitable levels of use (typically less than about 5% by weight).

Examples of suitable cationic photoinitiators may include sulfonium, iodonium or triflate salts such as: bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenylsulfonium triflate, (4-Bromophenyl)diphenylsulfonium triflate, (4-tert-Butylphenyl)diphenylsulfonium triflate, diphenyliodonium hexafluorophosphate diphenyliodonium nitrate, diphenyliodonium p-toluenesulfonate, diphenyliodonium triflate, (4-Fluorophenyl)diphenylsulfonium triflate, N-hydroxynaphthalimide triflate, N-hydroxy-5-norbornene-2,3-dicarboximide perfluoro-1-butanesulfonate, (4-iodophenyl) diphenylsulfonium triflate, (4-methoxyphenyl) diphenylsulfonium triflate, 2-(4-methoxystyryl)-4,6-bis (trichloromethyl)-1,3,5-triazine, (4-methylthiophenyl) methyl phenyl sulfonium triflate, 1-naphthyl diphenylsulfonium triflate, (4-phenoxyphenyl)diphenylsulfonium triflate, (4-phenylthiophenyl)diphenylsulfonium triflate triaryl sulfonium hexafluoroantimonate, tri aryl sulfonium hexafluorophosphate, triphenyl sulfonium perfluoro-1-butanesufonate, triphenylsulfonium triflate, tris(4-tert-butylphenyl)sulfonium perfluoro-1-butanesulfonate, tris (4-tert-butylphenyl)sulfonium triflate, etc. Commercial products such as Irgacure® 270 (high-molecular-weight sulfonium salt cationic photoinitiator) may be used.

Examples of suitable thermal initiators include benzoyl peroxide, tertiary butyl hydroperoxide, peroxide solution, ammonium persulfate, potassium persulfate, redox couples, sodium metabisulphite, Rongalite®, VA 044 (2,2'-azobis [2-(2-imidazolin-2-yl)propane] dihydrochloride), VA057 (2,2'-azobis[N-(2-carboxyethyl)-2-methyl-propioamidine]) and VA086 (2,2'-azobis[2-methyl-N-2-hydroxyethyl)-propionamide]) from Wako Chemicals. Compositions comprising thermal initiators may require heating to at least 60° C. to initiate polymerisation.

The added commercial and/or conventional photoinitiator may be present in any suitable concentration. For example, the added commercial and/or conventional photoinitiator may be present at a concentration of from about 0 to about 2 wt %. For example, the added commercial and/or conventional photoinitiator may be present in an amount of from about 0.1 to 2 wt %; from about 0.1 to about 1.5 wt %; or from about 0.5 to about 1 wt %.

Levelling/Wetting Agent

The compositions as described herein may include a levelling/wetting agent. Any suitable levelling/wetting agent may be used. Suitable levelling/wetting agents include silicone/polysiloxane or silicone polyether surfactants, such as sold by BYK®, e.g., the polyether modified siloxane BYK-346, Dow Corning®, e.g., Q2-5211, or a quaternary ammonium surfactant compound solution such as Quatramine C16/50. The levelling/wetting agent may be present in any suitable concentration. For example, the levelling/wetting agent may be present at a concentration of from about 0 to about 2 wt %, e.g., of from about 0.1 to 0.5 wt %; from about 0.5 to about 1.5 wt %; or from about 1.0 to about 2 wt %.

Surfactants/Surface Control Additives

The compositions of the invention may also include one or more surfactants or surface control additives. Surfactants or surface control additives are often optionally used to control the surface tension of an ink, which may be required to adjust the wetting on the face plate of the printhead, and also to give the desired drop spread on the substrate, or, in the case of multi pass inkjet printing, wet on dry drop spread. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361 BYK UV 3530 and 3570, CERAFLOUR 998 and 996, NANOBYK 3601, 3610, and 3650, and CERMAT 258. Available from Cytec are EBECRYL 350 and 1360, MODA- FLOW 9200, and EBECRYL 341. From Sartomer the aliphatic silicone acrylate CN9800 may be used. Surfynol104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont. Examples of suitable surfactants include, e.g., ethylenediaminetetraacetic acid (EDTA), which is advantageously approved for use in indirect food packaging applications (FDA approved), and Dispex® N 40 ap (a dispersing agent comprising a sodium salt of polyacrylic acid), etc.

In some embodiments, the surfactant or surface control additive is present in an amount of not more than 2 wt. %, not more than 1.5 wt. %, not more than 1 wt. %, or not more than 0.5 wt. %. In some embodiments, the surfactant or surface control additive is a non-ionic surfactant. In some embodiments, the surfactant or surface control additive is an anionic surfactant. In some embodiments, the surfactant or surface control additive is a cationic surfactant.

Biocide/Anti-Mould Agent

Since the compositions of the current invention are water-based in nature, it may also be preferable to include a biocide or anti-mould agent. Suitable examples include products based on the following biocide structural types: benz-iso-thiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111 S from Lonza, sodium benzoate (Vancide 51 from R. T. Vanderbilt), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the composition.

Defoamer

Defoamers can also optionally be included in the compositions of the invention; these prevent the formation of foam during manufacture of the ink and also while jetting. Defoamers are particularly important with recirculating printheads. Examples of suitable defoamers include TEGO FOAMEXN, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067 A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol104PA, AD01, DF-110, DF-58, DF-62, DF-66, DF-695, DF-70, and MD-20 are available from Air Products.

Rheology Modifiers

The compositions of the invention may also include one or more rheology modifiers. Rheology modifiers are organic or inorganic coating additives that control the rheological characteristics of the liquid formulation. In coatings technology, rheology modifiers are mainly used to provide either pseudoplastic or thixotropic properties. These can be divided into inorganic and organic materials; inorganic additives are typically clays, and fumed silicas, whereas organic materials can be subdivided into natural materials such as cellulosics/xanthin gum and synthetic materials which are then associative or non-associative type materials. Natural and synthetic rheology modifying agents have been used in water-based curable inks. For example, see EP 1464686, US 2010/041816, and WO 2011/079402. In preferred embodiments, the rheology modifiers are selected from poly(vinyl alcohol) (PVA) and polyvinylpyrrolidone (PVP).

Co-Solvent

Whilst the preferred compositions of the invention are water-based, and do not comprise any co-solvents, in some embodiments a minor amount of co-solvent can be present. In some embodiments, the co-solvent is miscible with the water. In some embodiments the co-solvent is miscible with water at the at least one particular temperature in the range of 20° C. to 60° C. The co-solvent may be polar. The co-solvent may be aprotic. In some embodiments, the co-solvent is polar aprotic, e.g., acetone, an alkyl acetate (e.g., ethyl acetate), acetonitrile, or propylene carbonate. In other embodiments, the co-solvent is polar protic, e.g., an alcohol such as ethanol, methanol, propanol, or butanol. In some embodiments, the co-solvent is selected to provide a reduced vapour pressure relative to water at the at least one particular temperature in the range of 20° C. to 60° C. In some embodiments, the co-solvent is selected from the group consisting of ethylene glycol, diethylene glycol, propylene glycol, glycerol, PEG 400, N-methyl pyrrolidone, and mixtures thereof. In some embodiments, the co-solvent is as FDA approved glycol, such as propylene glycol, or glycerol. In other embodiments, the co-solvent may be an alcohol such as ethanol or methanol. In other embodiments, the co-solvent may be acetone, an ether (e.g., diethyl ether), an alkyl acetate (e.g., ethyl acetate), or acetonitrile. In yet other embodiments, the solvent may be propylene carbonate. In various embodiments, the co-solvent constitutes less than 5, 4, 3, 2, or 1 wt % of the composition. In one embodiment, there is the proviso that there is no organic solvent or co-solvent present in the composition.

Filler

The compositions can be further formulated with additions of other filler components such as poly vinyl alcohol (optionally in solution), water soluble cellulose ethers, polyvinyl pyrrolidine, modified starches, urea, or one or more hygroscopic or deliquescent salts, etc. The compositions may still further comprise a dissolved metal species, such as an ion or aqueous complex of an ion of Al, Zn, Ba, Ca, or Mg. The dissolved metal species may be provided in any suitable form, e.g., provided as a soluble metal salt such as a chloride, sulfate, nitrate, carbonate, phosphate, acetate, etc. or as a salt that may be solubilised in water by pH modification, such as a metal oxide or hydroxide. In one embodiment, the dissolved metal species is solubilised zinc oxide, and the zinc oxide is solubilised by addition of sodium hydroxide. In another embodiment, the dissolved metal species is solubilised calcium chloride. In yet another embodiment, the dissolved metal species is calcium carbonate. In some embodiments, the filler is a water-insoluble or partially water-soluble compound such as Al, Zn, Ba, Ca, or Mg sulfate, carbonate, or phosphate. The compositions may still further comprise water-based urethanes, styrene/maleic anhydride (SMA) resins, zinc oxide soluble resins, etc. In some embodiments, sodium acrylate or methacrylate and/or ammonium acrylate or methacrylate may fulfil a filler function in the composition.

Plasticiser

The compositions of the invention may also include a plasticiser. A plasticiser advantageously increases flowability and reduces the film formation temperature of coatings. Any suitable plasticiser may be used. For example, the plasticiser may be a calcium salt such as calcium chloride.

In some embodiments, sodium acrylate or methacrylate and/or ammonium acrylate or methacrylate may fulfil a plasticiser function in the composition.

Aqueous Compositions

The compositions described herein comprise water. The compositions may have a water content of between about 5 and 80 wt %, or of have a water content of between about 5 and about 40 wt %, for example, between 5 and 15, or between 5 and 35, or between 10 and 40, or between 15 and 25, or between 20 and 30, or between 20 and 25, or between 25 and 35, or between 35 and 50, or between 50 and 70, or between 70 and 80 wt %. The compositions may have a water content of between about 10 and about 50 wt %, for example, of between 15 and 30 wt %. The compositions described herein may have a water content of less than 40 wt %, or less than 35 wt %, less than 30 wt %, less than 25 wt %, or less than 20 wt %.

Advantageously, using water in the compositions described herein reduces the cost of the resulting compositions substantially by comparison with conventional radiation cure inkjet or flexographic inks, primers and varnishes, which generally use volatile organic solvents. At the same time the compositions may be safer, healthier and more environmentally friendly. Furthermore, although conventional UV inks, in particular inkjet inks, being 100% solids have tended to create the problem of heavy ink films when printed, the compositions of the present invention having a water content of between about 5 and about 40 wt % advantageously allow the printed film weight to be reduced, resulting in improved print quality and lower cost. In one embodiment, there is the proviso that there is no organic solvent present in the composition.

Preferably the compositions herein have a pH of between 6.0 and 7.0, or of between 6.0 and 9.5, or of between 7.0 to 9.5, or of between 7.0 and 8.0, or of between 8.0 and 9.0, or of 7.0, 7.5, 8.0, 8.5 or 9.0. This pH may be adjusted using any suitable compounds, e.g., using sodium or ammonium hydroxide.

Substrates

The primers, inks and over-print varnishes of the present invention can be formulated to provide excellent adhesion to a wide range of substrates. Any suitable substrate may be used. For example, suitable substrates may include synthetic materials including woven or non-woven materials. Examples of synthetic materials include polymeric materials, (flexible) polymer films, three-dimensional plastic objects (including rigid and flexible 3D plastic objects), glass, metals and/or alloys, composite materials, synthetic resin surfaces, textiles and fabrics such as nylon/polyamide, viscose, rayon, acetate, acrylic, polyester, lyocell, modal, spandex, modacrylic, olefin, aramids, etc. Examples of natural materials include plant based textiles (e.g., hemp, cotton, rice, nettle, flax, jute, modal, bamboo, lyocell, straw), animal based textiles (e.g., wool, silk), parchment (including vellum), and paper, paperboard, and cardboard products, including papers derived from wood pulp, including printing papers, wrapping papers (including kraft paper), writing paper (e.g., ledger, bank, and bond paper), blotting papers, drawing papers (including cartridge paper), handmade papers (including decorative papers, Ingres papers, Japanese paper and tissues), specialty papers (such as industrial papers, cigarette paper), wallpaper, coated paper, book paper, inkjet paper, chromatography paper, photography paper, card, etc. The substrate may be a metallic object or comprise a metallic surface, e.g., the substrate may be or comprise a metal sheet, metal foil, metallised polymer, tin coated steel can, etc. The substrate may be a plastic object or comprise a plastic surface, e.g., low density or high density polyethylene, polyvinyl chloride, polypropylene, polycarbonate, polyethylene terephthalate, polystyrene, polyurethane, etc., e.g., in the form of a bottle, container, packet, wrap, film, bag, etc.

In one embodiment the substrate comprises a supporting web comprised substantially of a web of dewatered cellulosic fibres. In another embodiment the substrate comprises a web of nonwoven polymeric fibres. In yet another embodiment the substrate is a polymeric film. In a further embodiment, the substrate is one or more surfaces of a three-dimensional plastic or metallic object.

The primer compositions described herein may advantageously modify the surface of a non-porous substrate, such as a polymeric film, such that it is subsequently receptive to water-based inks, of both the conventional kind and a kind according to the present invention. The primer and coating compositions described herein may advantageously modify the surface of a porous substrate, such as lightweight paper, such that ink show-through is reduced or eliminated compared to an untreated substrate. The primer compositions described herein may also advantageously modify the surface of a porous substrate such that it becomes more receptive to a water-based ink. The primer compositions may further advantageously modify one or more surfaces of a three-dimensional polymeric or metallic object, such as a bottle, so as to enable direct printing thereon. The primer compositions may still further advantageously modify the surface of a cellulosic substrate so as to impart a desired finish, e.g., satin or gloss, without the need for conventional calendering at the paper mill.

The compositions described herein thus advantageously extend the range of substrates to which conventional water-based coatings and inks can be applied successfully. Without wishing to be bound by theory, the water content of the inventive compositions may allow more of the pigment and/or dye, when present, to remain on the surface of the substrate than can be achieved with conventional water-based inks, in particular, inkjet inks. This results in a potential 20% to 50% reduction, depending on the particular colour and the substrate, in the amount of ink required to maintain print colour saturation/densities by comparison with printing on the uncoated/untreated substrate. In addition, the primers, inks and coatings of the invention may achieve a degree of gloss on otherwise porous substrates and may simultaneously reduce or eliminate show-through from one side of the substrate to the other when printing on lightweight papers such as Bible papers and newsprint.

Composition Properties

The compositions of the present invention may be formulated to have any suitable viscosity. The skilled person will appreciate that the application method of the primer, ink, or varnish will influence the target viscosity of the composition. Generally, the compositions of the invention preferably have a final viscosity of between 20 and less than about 800 mPa·s (cP) at room temperature (25° C.). If anilox and roller coating is to be used to deliver the primer, ink or varnish, then the viscosity of the composition is advantageously adjusted to be, or is, between 200 and 600 cP, e.g., between 200 and 350 cP, or between 300 and 450 cP, or between 400 and 600 cP, or of about 200, 250, 300, 350, 400, 450, 500, 550 or 600 cP at 25° C. If spray coating is to be used to deliver the primer, ink or varnish, then the viscosity of the composition is advantageously adjusted to be, or is, between 20 and 50 cP, for example, between 20 and 35 cP, or between 30 and 45 cP, or between 25 and 50 cP, or of about 20, 25, 30, 35, 40, 45, or 50 cP at 25° C. For inkjet printing applications, in order for the ink to be discharged properly from the nozzle of an inkjet printhead without clogging, the composition may be adjusted so as to have a viscosity of below 20 cP at 25° C. Accordingly, the viscosity of the composition, when formulated for inkjet printing, is advantageously adjusted to be, or is, between 1 and 20 cP, for example, between 1 and 15 cP, between 10 and 20 cP, between 5 and 15 cP, or between 15 and 20 cP, or of about 1, 2, 5, 10, 15, or 20 cP at 25° C. Accordingly, the composition in accordance with the present invention may be modified such that a viscosity of the ink composition at a temperature of 25° C. is at most 20 cP. The compositions of the present invention, when formulated for application by inkjet printing, preferably have a viscosity substantially lower than what currently commercially available inks such as inkjet inks or coatings can achieve without prior heating above 25° C. The viscosity of compositions described herein can be modified or reduced, if required, by dilution with water, although other methods of modifying the viscosity will be known to those skilled in the art.

The compositions of the present invention preferably have a viscosity of between 2 and 30 centipoise (cP) at least one temperature in the range of 20-60° C. in their pure form. For example, a viscosity between 2 to 4, 4 to 6, 6 to 8, 8 to 10, 10 to 12, 12 to 14, 14 to 16, 16 to 18, 18 to 20, 20 to 22, 22 to 24, 24 to 26, 26 to 28, or 28 to 30 cP, or of between 2 and 10 cP, 5 and 20 cP, 15 and 30 cP, or of less than 60 cP, less than 50 cP, less than 40 cP or less than 30 cP. One of skill in the art knows that viscosity may be adjusted appropriately for different types of printing, such as flexographic or rotogravure printing.

Method of Preparing the Curable Composition

The coating composition of the present invention can be prepared by mixing a metal salt (or its precursor organic compound and metal compound), co-monomer (if present), water, and any one or more of the above-mentioned optional components in a suitable ratio in, for example, an agitator, a dissolver, a homogenizer, or a dispersion mixer.

For example, provided herein is a method of preparing a curable composition comprising a metal salt, the method comprising the steps of: reacting a metal compound with an organic compound, wherein the organic compound comprises an acidic hydrogen and at least one polymerizable unsaturated group, thereby producing the metal salt.

The metal compound, metal salt and organic compound are described in the sections above entitled "Metal salts and metal compounds" and "Organic compound", respectively. A molar excess of organic compound may be used in the reacting step, where the molar excess of organic compound is a co-monomer as described in the section above entitled "Co-monomer".

The step of reacting may comprise adding metal compound particles to the organic compound with mixing. In some embodiments, the metal compound particles react and dissolve in the organic compound such that a transparent solution results. In some embodiments, the organic compound is partially pre-neutralised by reaction with a base such as aqueous sodium hydroxide. So, for example, the metal compound (e.g., metal oxide) may be added to the organic compound (e.g., acrylic acid), where the organic compound has been partially neutralised with an aqueous base (e.g., aqueous sodium hydroxide solution) to raise the pH of the organic compound. In such embodiments, formation of some organic compound salts of the base (e.g., sodium acrylate) would be expected prior to addition of the metal compound (e.g., metal oxide). In yet further embodiments, the metal compound (e.g., metal oxide) is added to a pre-neutralised organic compound (e.g., pre-neutralised with a base such as aqueous sodium or ammonium hydroxide to form a sodium or ammonium acrylate salt solution, having a pH of between, e.g., 7 and 10), after which further organic compound is added (e.g., acrylic acid) to complete dissolution of the metal compound.

The step of reacting may instead comprise: providing a suspension of metal compound particles in a solvent; and adding the suspension to the organic compound with mixing. The solvent may be any suitable solvent, e.g., may be a solvent as described in the above section entitled "Co-solvents", or may be water. The solvent is preferably water.

The step of reacting may alternatively comprise: adding the metal compound to a basic solution; and adding the metal compound in basic solution to the organic compound, with mixing. The basic solution may be an aqueous solution comprising a hydroxide salt. The hydroxide salt may be sodium hydroxide, potassium hydroxide, ammonium hydroxide, or a mixture thereof. The basic solution may have a pH of between about 7 and 10 or more preferably of between about 10 and 14. The basic solution may facilitate dissolution of the metal compound and/or react with the organic compound and/or metal salt. Accordingly, in some embodiments, the metal compound (e.g., metal oxide) is added to a basic aqueous solution (e.g., a solution of sodium hydroxide in water having a pH of between 10 and 14) to solubilise the metal compound prior to reaction with the organic compound, e.g., acrylic acid.

The organic compound and the metal compound may react to form a mixture having a pH of between 1 and 8, e.g., a pH of 6.5-7.5, but is typically acidic at a pH of between 1 and 6, e.g., pH of between 1 and 4, if excess unreacted organic compound is present. The method may further comprise adjusting the pH of the composition to between 5 and 7, if required, to neutralise any excess organic compound. The pH may be adjusted using sodium hydroxide, potassium hydroxide, or ammonium hydroxide, N,N-dimethyl-D-glucamine, aminomethyl propanol, or a mixture thereof, or any other suitable base.

The method may be devoid of adding a commercial and/or conventional photoinitiator to the composition.

The method may further comprise the step of adding a pigment, and/or a filler selected from the group consisting of: calcium chloride, calcium carbonate, urea, or a water-soluble salt, and/or a wetting agent.

Method of Curing the Curable Composition

The compositions of the present invention can be cured using UV (including LED UV) radiation or EB, or a combination of both. The preferred intensity of the UV radiation is in a range from 100 to 1000 mJ/cm$^2$, preferably from 200 to 800 mJ/cm$^2$.

In some embodiments, the compositions described herein are curable by application of UV or EB radiation, and do not require pre-treatment with IR or heat. In some embodiments, the compositions described herein are curable by application of UV radiation. In other embodiments, the compositions described herein are curable by application of electron beam (EB) radiation. Whilst the compositions of the invention may be cured with a heat source such as IR, this is important only for commercial convenience of inkjet presses already fitted with IR drying facilities. Preferably the composition cures to a substantially water insoluble composition without the need for heat to be applied to dry it.

Radiation Source

The compositions of the present invention are preferably radiation curable. The radiation or energy source used for achieving polymerization and/or crosslinking of the curable functionality is preferably actinic, including radiation having a wavelength in the ultraviolet (UV) or visible region of the spectrum, accelerated particles (e.g. electron beam (EB) radiation), thermal (e.g. heat or infrared radiation (IR)), or the like. Use of actinic radiation enables excellent control over the initiation and rate of polymerization and/or crosslinking. Additionally, actinic radiation can be used for curing at relatively low temperatures. This avoids degrading or evaporating components that might be sensitive to the relatively high temperatures that might be required to initiate polymerization and/or crosslinking of the energy curable groups when using high temperature curing techniques. Suitable sources of curing energy include lasers, electron beams, mercury lamps, xenon lamps, carbon arc lamps, tungsten filament lamps, sunlight, low intensity ultraviolet light (UV), LED UV, UV laser light, and the like. The UV radiation may have a wavelength of between 370 and 410 nm, and more preferably, a wavelength of between 360 and 395 nm. The LED UV radiation may have dual wavelengths incorporated in a single unit between 300 and 350 nm combined with between 360 and 395 nm.

Preferably, the compositions of the invention are cured by UV or EB radiation, and still more preferably, are cured by UV or EB radiation without applying heat. Accordingly, in some embodiments, the compositions disclosed herein are aqueous, radiation curable primer, inkjet or flexographic ink or varnish compositions, and in preferred embodiments, are aqueous, UV or EB radiation curable primer, inkjet or flexographic ink or varnish compositions, and in more preferred embodiments, are aqueous, UV or EB radiation curable primer, inkjet or flexographic ink or varnish compositions devoid of added commercial and/or conventional photoinitiator.

Cured Coating Composition

The cured coating composition preferably has a glass translation temperature of greater than 80° C., preferably from 80° C. to 250° C., and more preferably from 85° C. to 130° C.

The compositions herein may be suitable for indirect food contact applications. In some embodiments, the compositions are suitable for indirect food contact applications as they contain no added commercial and/or conventional photoinitiator compounds. In other embodiments, if a photoinitiator is required, an FDA (or other national/regional equivalent body) approved photoinitiator may be used. In yet further embodiments, the additional components in the compositions are FDA approved (or equivalent), such as the surfactant. In such embodiments, other components of the compositions herein will be selected so as to be non-toxic to humans, or food safe. For example, in particular, the metal salt will be chosen so as to comprise a non-toxic metal, or a metal that is regarded as food safe, at the concentrations and forms used in the composition. The cured coating composition preferably displays gloss levels (measured with a KSJ Model MG268-F2 Glossmeter at 60°) of between 50% and 95%.

The compositions of the present invention are curable. Upon curing, the compositions polymerise and form an ink or toner receptive primer film, an ink, or a protective over-print varnish film. The cured films formed by the compositions of the invention may have a thickness of between about 3 and about 6 µm. For example, the cured films formed by the compositions of the invention may have a thickness of between about 3.0 and 4.0 µm, or between 4.0 and 5.0 µm, or between 5.0 and 6.0 µm, or between 3.0 and 4.5 µm, or between 4.0 and 5.5 µm, or between 4.5 and 6.0 µm, e.g., a thickness of 3.0 µm, 3.5 µm, 4.0 µm, 4.5 µm, 5.0 µm, 5.5 µm, or 6.0 µm.

Primer films formed by compositions of the invention are preferably ink receptive to inkjet or flexographic inks, including inks of the invention. The primer films are ink-receptive, for example, by being wettable by or by being able to absorb inkjet or flexographic inks. Whilst the "base" composition of the invention comprising a metal salt and water (and in some embodiments, excess organic compound, and in other embodiments, excess organic compound and a solubilised metal salt such as calcium chloride, and in other embodiments, sodium and/or ammonium acrylate co-monomer), is generally waterproof, water-resistant and/or ink-repellent, the primers may be made ink-receptive by incorporation of a superabsorbent polymer such as polyacrylic acid, or polyacrylic/methacrylic acid or their salts, or by incorporation of a surfactant such as an ionic surfactant, or polyvinyl alcohol (PVA) or its copolymers, into the compositions of the invention.

Cured over-print varnish films formed by the compositions of the invention are preferably waterproof or substantially water resistant.

The compositions described herein may be adapted to deliver a friction-adjustable glossy surface finish to a substrate after curing. The friction may be provided by a roller rotating in opposition to the machine direction, such as a stainless steel, compressed cardboard or fabric surface roller wherein the level of gloss can be accurately controlled by the rotational speed of the reverse rotating roller.

Uses

The compositions described herein may be used as primers, inks, or as over-print varnishes. Accordingly, there is provided use of a curable composition as described herein as a primer composition. There is also provided use of a curable composition as described herein as an inkjet ink. There is also provided use of a curable composition as described herein as a flexographic ink. There is further provided use of a curable composition as described herein as an over-print varnish.

Application of Primers, Inks and Varnishes

Provided herein is a method for coating a substrate, the method comprising the steps of: applying a curable composition as described herein onto the substrate; and curing the curable composition to thereby provide a cured coating on the substrate.

Also provided herein is a method for priming a substrate, the method comprising the steps of: applying a curable composition as described herein onto the substrate; and curing the curable composition to thereby provide a cured primer film on the substrate. The application may be by roller. Preferably, the primer film adheres to the substrate. Preferably, water will be absorbable into the primer film such that inkjet or flexographic printing can be undertaken on the primed substrate at line speeds of 30 m/minute to 600 m/minute, for example, at line speeds of between 30 m/minute-200 m/minute, between 200 m/minute-400 m/minute or between 400 m/minute-600 m/minute.

Relatedly, disclosed herein is a method for coating a substrate to prepare a printable surface, the method comprising the steps of: applying a curable composition as described herein onto a substrate; and curing the curable composition to thereby provide said printable surface. The printable surface is preferably an inkjet or flexographic ink printable surface, but can also be a Liquid Electro Photographic Toner (LEP), a Dry Toner (Xerography), or an oil-based inkjet commercial printing system printable surface.

There is also provided herein a method for printing on a substrate, the method comprising the steps of: printing a curable composition as described herein onto a substrate; and curing the curable composition to thereby provide a cured coating on said substrate. In some embodiments, the substrate comprises a primer film on a surface thereof.

Also provided herein is a method for varnishing a substrate comprising a printed surface, the method comprising the steps of: applying a curable composition as described herein onto the printed surface; and curing the curable composition to thereby provide a cured varnish on the printed surface. The application may be by roller. The varnish is preferably waterproof or water-resistant. The varnish is preferably a protective over-print varnish. The over-print varnishes herein may be applied to a substrate printed with an uncured (i.e., wet) UV curable offset or flexographic ink or a wet non-UV lithographic ink. In such cases, the over-print varnish is cured and acts as an impermeable barrier to the uncured/wet inks below it.

The primers, inks and varnishes of the present invention may be cured separately after addition of each coating. For example, in some embodiments, a primer will be applied to a substrate and cured, an ink will be subsequently applied to the cured primer layer and cured, and a varnish will be applied to the cured printing layer and cured. The curing may comprise a single mode, such as UV or EB, throughout, or may be a combination of independently selected curing modes, e.g., the primer and ink may be UV cured and the varnish EB cured.

However, in other embodiments, inkjet or flexographic ink compositions of the present invention or other conventional inks may be "pinned" or fixed to a substrate coated with a primer according to the present invention without being cured using radiation, and the (uncured) printed layer subsequently coated with an over-print varnish according to the present invention, and the primer, printed pinned layer, and the over-print varnish layer all cured simultaneously at the end of the coating process. In such embodiments, the simultaneous cure is preferably an EB curing process. In other embodiments, the primer layer is cured, and a subsequently applied printed layer is pinned to the primer, a varnish composition is applied, and the ink and varnish are simultaneously cured. In yet further embodiments, a primer composition is applied, printed layer is pinned to the uncured primer, and the primer and ink are simultaneously cured. A varnish layer may then be applied to the cured primer and ink coating and cured separately.

The curing of the primer, ink and/or varnish may comprise irradiating the composition in air at room temperature with an EB dose in the range of between 0.1 and 10 Mrad. No inert atmosphere blanket may be required during the curing stage. The curing of the primer, ink and/or varnish may alternatively comprise exposing the composition to UV energy in air at room temperature. The UV energy may be supplied by an LED UV or UV lamp. Preferably, no initial heating step is required for curing and/or drying the compositions herein.

The compositions of the invention can be applied to a substrate in any suitable manner. When formulated as inkjet inks, compositions as described herein are suitable for application by inkjet printing. Examples of suitable commercial inkjet printers are given in the section entitled 'Printing Press'. When formulated as flexographic inks, compositions as described herein are suitable for application by flexographic printing. Examples of suitable commercial flexographic printers are given in the section entitled 'Printing Press'. When formulated as primers or varnishes, suitable application methods for compositions described herein may include single pass inkjet printing, spray coating, curtain coating, Mayer bar, flexographic, gravure, blade coating, anilox and roller coating. Accordingly, the primers and varnishes of the invention as described herein are suitable for a range of digital printing technologies, including (but not limited to) inkjet, HP Indigo, Landa Nanographic and other wet and dry toner systems. As noted above, the viscosity of the composition, as well as the additional components included in the composition, may be tailored by one of skill in the art for a specific application method. As also noted above, the primers and varnishes may advantageously improve the surface of a substrate, e.g., by modifying the surface characteristics (matt, satin or glossy), and/or by rendering the surface more receptive to ink or toners.

The compositions of the invention may be applied to a substrate or surface thereof at any suitable density. For example, a suitable application density (in composition weight per unit area) may be between 1 g/m$^2$ and 20 g/m$^2$. For example, the application density may be between about 1 and 5 g/m$^2$, or between about 5 and 10 g/m$^2$, or between about 10 and 15 g/m$^2$, or between about 15 and 20 g/m$^2$, or about 1, 2, 3, 4, 5, 6, 7, 8, 9, 10, 11, 12, 13, 14, 15, 16, 17, 18, 19, 20 or 25 g/m$^2$. If cured with UV radiation, coating weights of between about 1 and 10 g/m$^2$ may be used. If cured with EB radiation, application densities of between about 1 and 20 g/m$^2$ may be used.

The curing is preferably complete or substantially complete, and/or the printable surface is preferably printable at line speeds in the range 30 m/minute-600 m/minute, for example, at line speeds of between 30 m/minute-200 m/minute, between 200 m/minute-400 m/minute or between 400 m/minute-600 m/minute.

Further disclosed herein is a method for producing a substrate having a coating thereon whereby the gloss level of said coating is controllable to a predetermined level, the process comprising the steps of: applying a coating composition as described herein onto said substrate; polymerising said coating composition to produce a cured coating; and buffing the surface of said cured coating sufficiently to achieve said predetermined gloss level. The buffing step may be achieved by contacting the surface of the coating with a roller rotating in a first direction and moving the substrate with respect to the roller in the opposite direction to the first direction. The roller may be any suitable roller, such as a stainless-steel roller, compressed cardboard roller or a fabric covered roller.

Printing Press

Described herein is an inkjet or flexo printing press comprising: a means for applying a primer according to the invention onto one or both sides of a substrate to be primed; means to cure said primer(s) to produce a primed, printable substrate; means to print onto said primed, printable substrate to produce a printed substrate, and optionally, means to apply a varnish according to the present invention to the printed substrate. The printing means may utilise an ink as described herein, or a commercially available inkjet ink such as HP ink, Canon ink, Fujifilm ink, RR Donnelly ink, Epson ink or the like. The printing means described herein may utilise an ink as described herein, or a commercially available flexographic ink such as Flint Hydrofilm 4000, Toyo Akwa PK, Seigwerk Uniwrap or Sun Chemical Solar Aqua, Prismatic UViFlex, or the like. The priming means and/or printing means may additionally or alternatively utilise primers or inks as described in WO 2018/076068, the contents of which is incorporated herein by reference in its entirety. The means for applying a primer and means for applying a varnish may each be independently selected from gravure, roller coating, anilox, curtain coating, blade coating, spray bar or Mayer bar.

Although it is standard practice in the art to treat a substrate such as paper at the time of manufacture of the paper, the primers of the invention as described herein advantageously enable surface treatment of a paper substrate (and also other substrates as described above) at the commencement of and as a part of a printing operation. Accordingly, described herein is a printing press having a front-end design that can be incorporated into existing press lines, or designed into new press lines. Suitable commercial presses for use in combination with the front-end press design described herein may include inkjet presses such as Fuji Xerox FX 1400, Canon Oce Colour Stream 3700, RISO ComColour Xl, KBA RotaJet 76, Heidelberg Primefire 106, KBA RotaJet 106, HP T300 and T370 and Dainippon Screen TruePress Jet 520ZZ; HP Indigo presses such as HP Indigo 5000 and HP Indigo 7000; Offset presses such as manroland newspaper press running offset UV inks and manroland newspaper press running cold-set offset inks such as the Manroland Goss Colorman eline (https://www.manrolandgoss.com/en/solutions-information-reader/items/colorman-eline.html). Suitable commercial presses for use in combination with the front-end press design described herein may include flexographic presses such as the Bobst MW 85F/125F CI flexo press (https://www.bobst.com/auen/products/flexo-ci/ci-flexo-presses/#.XKAJt5gzY2x) and KBA CI flexo press such as the NEO XD (https://www-.koenig-bauer.com/en/products/flexo/ci-flexo-presses/neo-xd-lr/) and Coating units such as Rotamag Qantum 8/340 manufactured by Rotary Engineering Pty Ltd.

The inkjet or flexo printing press of the invention may be a web-fed press, or it may be a sheet-fed press.

Figure 2:
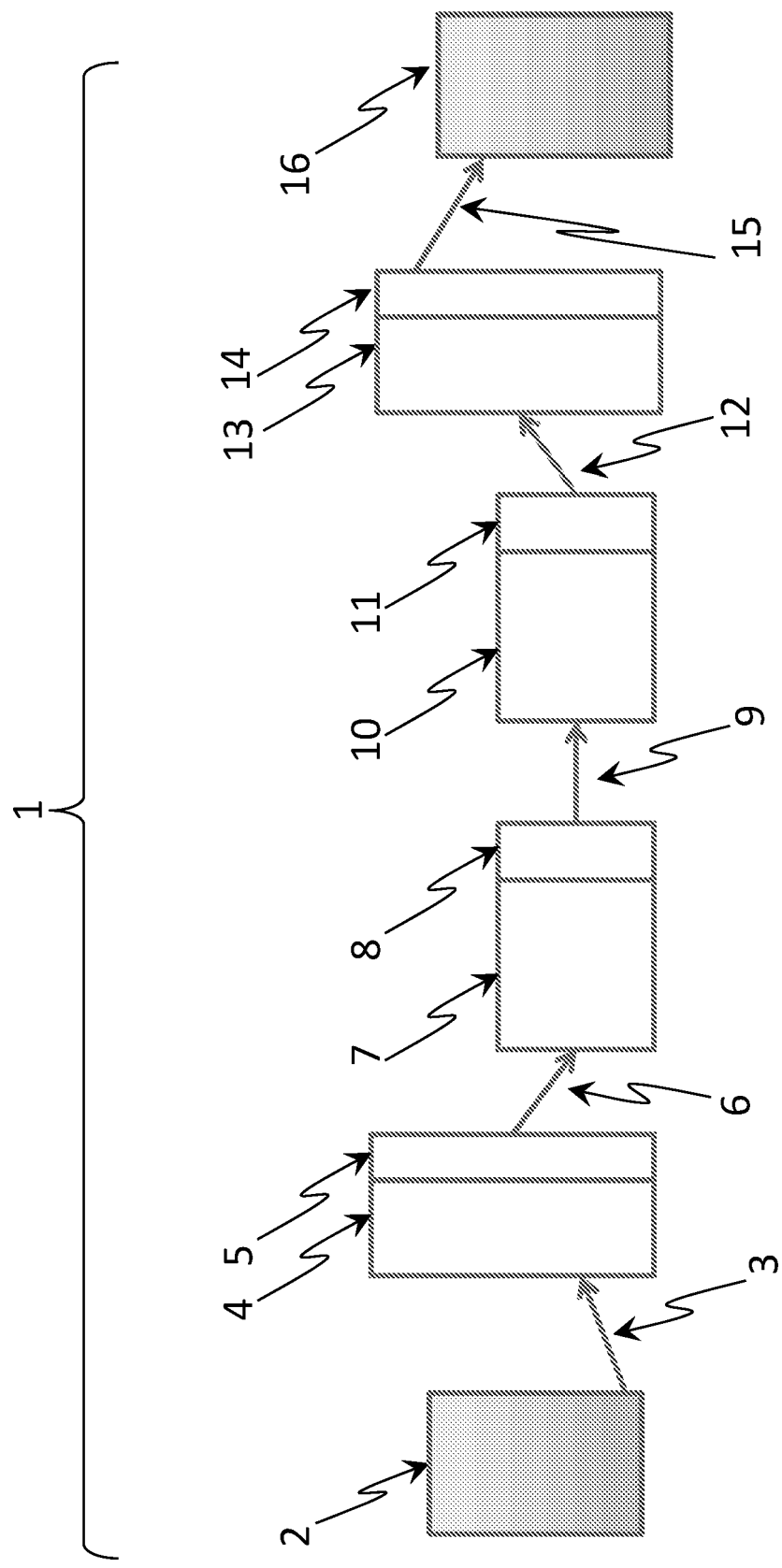
FIG. 2 is a schematic illustration of a sheet-fed inkjet or flexo press line with radiation curing priming/pre-coating, printing and overprint varnishing which can utilise primers and/or inks and/or varnishes of the present invention.

Embodiments of the design of this printing press are illustrated diagrammatically in FIGS. 1 and 2.

FIG. 1 is a schematic illustration (not to scale) of a press line 1 according to an embodiment of the present invention with priming/pre-coating using curable primers, inks and protective overprint varnishes based on compositions of the present invention applied in a web reel to reel modality. Only two printing units are illustrated in FIG. 1 (7, 10) but the number of printing units could, in practice, be much greater, and particularly in the case of flexo printing the number of printing units could be eight or more. The line 1 comprises an unwind reel 2 having a reel of substrate 3, which in one embodiment is cellulose paper. The substrate 3 is fed into a priming tower 4 having a UV or LED UV or EB curing unit 5 and reverse rotating buffing rollers (not shown) which can be optionally engaged (depending on the finish required on the substrate). The primer is preferably selected from the coatings of the invention and as described in the examples above. The primed paper substrate 6 is fed into a first print unit 7 for printing a first side of the substrate, preferably using inks of the present invention. A first curing station 8 comprising UV lamps or LED UV then cures or "pins" the applied ink(s). The printed paper substrate 9 is fed into a second print unit 10 for printing a second side of the substrate if required, optionally using inks of the present invention. A second curing station 11 comprising UV lamps or LED UV then cures or "pins" the applied ink(s). The coated and printed substrate 12 is then fed into a final varnishing tower 13 which can be engaged or disengaged as required for application of a protective overprint varnish of the present invention, where it is through-cured at UV, LED UV or EB curing unit 14 then subsequently the finished printed web 15 is wound onto a receiving rewind reel 16.

With reference to FIG. 1, the press 1 may include a roll sheeter unit (not shown) for cutting the reel of substrate 3 prior to the substrate being fed into the coating tower 4 or print unit 7 (i.e., a sheet-fed press with in-line roll sheeter). The re-wind reel 16 may optionally be substituted by a sheeter or die cutter (not shown).

FIG. 2 is a schematic illustration (not to scale) of a press line 1 according to another embodiment of the present invention with priming/pre-coating using curable primers, inks and protective overprint varnishes based on compositions of the present invention applied in a sheet fed modality. Only two printing units are illustrated in FIG. 2 (7, 10) but the number of printing units could, in practice, be much greater, and particularly in the case of flexo printing the number of printing units could be eight or more. The line 1 comprises an infeed stack unit 2 having a sheet of substrate 3, which in one embodiment is cellulose paper. Sheets of substrate 3 are fed into a priming tower 4 having a UV or LED UV or EB curing unit 5 and reverse rotating buffing rollers (not shown) which can be optionally engaged (depending on the finish required on the substrate). The primer is preferably selected from the coatings of the invention and as described in the examples above. The primed paper substrate 6 is fed into a first print unit 7 for printing a first side of the substrate, preferably using inks of the present invention. A first curing station 8 comprising UV lamps or LED UV then cures or "pins" the applied ink(s). The printed paper substrate 9 is fed into a second print unit 10 for printing a second side of the substrate if required, optionally using inks of the present invention. A second curing station 11 comprising UV lamps or LED UV then cures or "pins" the applied ink(s). The coated and printed substrate 12 is then fed into a final varnishing tower 13 which can be engaged or disengaged as required for application of a protective overprint varnish of the present invention, where it is through-cured at UV, LED UV or EB curing unit 14 then subsequently the finished printed sheet 15 is fed into a delivery sheet stacker 16.

Table 1 details some of the various permutations and combinations of primers, inks, varnishes and printing modalities encompassed by the present invention. It will be appreciated that other variations are available, and the following list is intended to be by way of non-limiting example only.

TABLE 1

Printing Press variations

| Version | Primer | UV/EB | Print 1 | UV | Print 2 | UV | OPV | UV/EB | Post-print |
|---|---|---|---|---|---|---|---|---|---|
| 1 | ✓ | ✓ | ✓ | ✓ | ✓ | ✓ | ✓ | ✓ | ± |
| 2 | ✓ | ✓ | ✓ | ✓ | ✓ | ✓ |  | ✓ | ± |
| 3 | ✓ | ✓ | ✓ | ✓ | ✓ |  |  | ✓ | ± |
| 4 | ✓ | ✓ | ✓ | ✓ |  |  | ✓ | ✓ | ± |
| 5 | ✓ | ✓ | ✓ | ✓ |  |  |  | ✓ | ± |
| 6 |  |  | ✓ | ✓ | ✓ | ✓ |  | ✓ | ± |
| 7 | ✓ | ✓ | ✓ |  | ✓ |  | ✓ | ✓ | ± |

Key:
Version 1. This arrangement is identical to that shown in FIGS. 1 and 2 using the primers and OPV of the invention and may utilise inks of the present invention, or conventional UV inkjet or other inks.

Version 2. This arrangement is identical to that shown in FIGS. 1 and 2 using the primers and inks of the invention except that now overprint varnish (OPV) is not applied over the inks.

Version 3. This arrangement is identical to that shown in FIGS. 1 and 2 using the primers of the invention together with conventional UV inkjet or flexo inks but not applying any OPV over the inks.

Version 4. This arrangement is identical to that shown in FIGS. 1 and 2 using the primers, inks and OPV of the invention with the exception that only one side of the web or sheet is printed.

Version 5. This arrangement is identical to that shown in FIGS. 1 and 2 using the primers and inks of the invention but printing only one side and not applying any OPV.

Version 6. This arrangement is identical to that shown in FIGS. 1 and 2 using only the inks of the invention without applying any OPV over the inks.

Version 7. This arrangement is identical to that shown in FIGS. 1 and 2 using only the primers and OPV of the invention but instead of the inkjet or flexo printing modalities, any one of the following is used: liquid electrophotographic toner (LEP) system or HP Indigo digital press line or Landa Nanographic press line with radiation cure priming/pre-coating and conventional air-dry or UV cure flexographic, lithographic or gravure.

In Table 1, the last column refers to post-print operations including but not limited to: sheeting, creasing and folding, diecutting, gluing and guillotining. The symbol ± is used to illustrate that these post print operations may or may not be included with any one of the 7 versions.

Using the printing press described herein, a low-grade or inexpensive substrate, such as a reel of newsprint, super calendered (SC) paper or polymeric film, can be used to produce a high quality printed product by incorporating an in-line primer application and UV/EB curing step. This in-line application/curing step can be performed at commercial press speeds, and the primed substrate can then be printed in-line with the inkjet or flexographic inks of the invention, optionally have a protective OPV applied, and subsequently cured in-line to produce a high quality printed product. The priming/coating unit is compatible with different printing modalities, including high-speed commercial web inkjet presses, and the substrate can be sheetfed rather than web. Indeed, the front-end design of the press incorporating the priming units and their respective radiation curing units can be fitted to any existing inkjet press line by retrofit or by incorporating into the press during manufacture. The printing press described herein is suitable for the primers, inks and varnishes of the present invention when used in combination. However, in some embodiments, a commercial/conventional primer and/or a commercial/conventional ink may be substituted.

Whilst existing primers for inkjet printing are clear fluids designed to maintain the essential haptic or look and feel of the original substrate and create no material change to those characteristics, the printing press described in this example, in combination with the primer compositions according to some embodiments of the invention as described herein, can modify the substrate surface. This process supersedes and greatly simplifies the current method for producing satin or gloss coated paper stocks.

Advantages of the printing press described herein in combination with the primers and/or varnishes of the invention may include any one or more of the following:

this process can significantly increase gloss levels and reduce show-through of printed text and pictures from one side of the sheet to the other on thin papers such as Terbook TB40, 40 g/m$^2$ paper and Bolloré PrimaPage New 34 g/m$^2$ relative to existing printing technologies.

the primers of the invention only add 1.5 μm to 2.5 μm to the thickness of a paper sheet in some embodiments, thereby keeping any increase in thickness of the paper sheets to a minimum, which is particularly desirable for large volumes of pages when bound into book format.

when the primer/coatings of the invention are applied to a cellulosic substrate and cured with UV or EB radiation and subsequently printed in line with conventional inks, the volume of ink required to maintain density may be up to 25% less than that required to print the same image or text with the same inks on an untreated cellulosic substrate.

The compositions of the present invention may provide various advantages, such as one or more of the following.

(i) The ability to cure the inks and coatings by UV, LED UV or EB radiation without the need for any external heat, or the flexibility to cure thermally, such as with IR, with addition of a free radical catalyst.

(ii) Being solutions, the inks can be formulated with either pigment or dye colourants or, a combination of pigment and dye colourants in the same ink. Accordingly, the present invention provides additional flexibility compared to prior art coating compositions and inks. Additionally, being able to formulate with combination of pigment and dye colourants in the same ink means that a wider range of colours and colour combinations are possible than to prior art coating compositions and inks. For example, ink formulations with a combination of pigment and dye colourants provide the widest colour gamut and the most transparent prints for the most vibrant colour rendition.

(iii) There are advantages to use of a water soluble composition compared to compositions relying on monomer or polymer emulsions. Emulsions will consist of micron size monomer or polymer particles which are hydrophobic and suspended in their water carrier. Water must be evaporated in these systems, and is not driven off by the polymerisation reaction.

(iv) The inks and varnishes described herein are water resistant when cured, and thereby solve a major problem of conventional dye-based water-based inkjet inks, which tend to be strongly affected by accidental liquid spillage on printed material such as newspapers or books.

(v) The inks of the invention, when cured, have a 30%-40% lower film thickness than conventional 100% solids UV inkjet inks for the same quantity of applied ink. The inks of the prior art create a Braille effect, which can be undesirable and is substantially ameliorated by the inks of the invention.

(vi) The inks of the invention can be adjusted to provide low viscosity at 25° C. in some embodiments, which is particularly suitable for commercially-available equipment, and may not require a heating step in some embodiments to be jettable as an inkjet ink, as per conventional inks.

(vii) When used in conjunction with conventional water-based inks, the primers of the invention may enable a reduction of the required ink concentration in the range 20% to 30% to maintain colour density by comparison with printing with the same ink on uncoated cellulose fibre substrates.

(viii) The inks and primer compositions of the invention provide significant reduction of "show-through" of print on lightweight paper substrates, and facilitate multi-colour printing, e.g., Multi-colour printing, with inkjet these "thin paper" substrates which, up until now, have been limited to monochrome printing if they could be printed at all with inkjet.

(ix) The primer and overprint varnish compositions of the invention can provide up to 35% increase in tensile strength of low-grade lightweight papers, such as newsprint. For example, a light coating of 2 g/m² each side of a 34 g/m² lightweight paper may produce up to a 15% increase in tensile strength in the machine direction. This means that a lower grammage base paper can be used in place of the finished paper currently used, yielding significant mileage advantage. By way of example, a 70 g/m² inexpensive base sheet can be used in place of a 90 g/m² expensive inkjet paper with a yield advantage of over 3,000 m² per tonne representing an increase of almost 30%. By comparison with printing on uncoated paper, printing on primers of the present invention have shown ink saving in excess of 20%, which more than covers the cost of the primer/coatings.

(x) The primers, inks and coatings of the invention may not require the use of conventional photoinitiators to cure with UV, allowing their use for direct and indirect food contact packaging. The absence of photoinitiators and/or the benign chemical components used in the compositions of the invention means that in some embodiments, the compositions may be certifiable under Swiss Ordinance SR 817.023.21. This will provide packaging printers with a significant advantage over conventional UV products for the packaging industry which have been exceedingly difficult to certify and costly to use.

(xi) The primers, inks and coatings of the invention may be cured by EB without the need for nitrogen blanketing and with at least 30% less radiation power. Conventional EB curing products require an enclosed nitrogen environment to allow complete surface curing by inhibiting oxygen at the curable surface. Therefore, the capital and ongoing operational costs of EB equipment are anticipated to be significantly lower for compositions of the present invention, which do not require a nitrogen blanket, compared to conventional EB curing products which do.

(xii) As a result of not requiring nitrogen blanketing, the primers, inks and coatings of the invention can be used with EB curing in applications other than web-based reel to reel, including, but not limited to, sheetfed inkjet printing and inkjet printing on 3-D objects, bottling lines. It has not previously been feasible to EB cure in a sheetfed modality, for example, due to non-containment of nitrogen. The primer/coatings of the invention can be cured at speeds up to 500 m/m with EB.

(xiii) The primer compositions of the invention can be used as 'additives' in the final stages of the papermaking process to provide surface finishes which are printable by digital toner and inkjet printing methods, as well as conventional printing methods of lithographic and flexographic printing.

(xiv) The compositions of the invention enable production of inks and OPV's that cost 50% of current coating and ink compositions. Apart from significant cost savings, having primers, inks and OPVs from the same chemistry base can avoid the incompatibilities that may occur with mixed source products.

(xv) The optically clear overprint protective varnishes of the invention achieve extremely high levels of gloss in some embodiments that are at least equivalent to (if not exceeding) gloss levels of conventional 100% solids-based UV/EB varnishes and can be reduced in gloss as required with different matting agents.

(xvi) The overprint varnishes of the invention can be applied successfully in-line on the printing press over wet UV offset or flexo inks as well as over wet non-UV lithographic or flexo inks.

EXAMPLES

The present invention will now be described with reference to the following examples which should be considered in all respects as illustrative and non-restrictive.

In the following examples, unless otherwise stated, the zinc and magnesium oxides are supplied as solids. Suitable commercial sources of zinc oxide include Zinc Oxide Australia Pty Ltd, and suitable commercial sources of zinc oxide and magnesium oxide include Redox Pty Ltd and Consolidated Chemicals Ltd. In the following examples, unless otherwise stated, the acrylic acid is supplied as a neat liquid. Suitable commercial sources of acrylic acid include, for example, Sigma Aldrich® anhydrous 99% acrylic acid. In the following examples, unless otherwise stated, the sodium hydroxide is supplied as a solid prill and is made into a 25% (w/v) aqueous solution.

Example 1: Formulation of Gloss Overprint Protective Varnish—Radiation Curable

| Component | Example 1A EB or medium speed UV curable Without added photoinitiator (#2-1801) Weight % | Example 1B LED or high speed UV curable With added photoinitiator (# 2-1801A) Weight % |
| --- | --- | --- |
| ZnO | 15.0 | 15.0 |
| Acrylic acid | 48.0 | 48.0 |
| 25% NaOH solution | 21.8 | 21.6 |
| CaCl$_2$ | 15.0 | 15.0 |
| Tego ® 245 | 0.2 | 0.2 |
| TPOL or Irgacure ® 2959 | — | 0.2 |
| total | 100.0 | 100.0 |

Referring to the above table, the ZnO was dissolved in the acrylic acid with mixing until the solution became clear. Once clear, the 25% NaOH was added to adjust the pH to between 6 and 7. Finally, the CaCl$_2$ (plasticiser) and Tego® 245 (levelling agent), and optionally for Example 1B, also the photoinitiator TPOL or Irgacure® 2959, were added, with stirring while maintaining the temperature below 90° C. throughout. The resultant composition is a UV radiation or EB curable gloss overprint protective varnish.

The compositions were applied with a #1 (Yellow) Meyer bar to sheets of 90 g/m² Stirling offset paper sheets had previously been printed in both text and 4-colour with HP inkjet inks and DIC wet litho inks. The coated sheets were then transferred to a laboratory conveyor belt passing under a UV lamp at 15 m/m and receiving a radiation dose of 55 mJ from each of twin UV mercury filaments transmitting at wavelengths between 360 nm and 395 nm with nominal power of 200 W per inch.

The coatings cured instantaneously and were immediately tested for gloss level and adhesion to both the inks and paper. Gloss level over the HP inks and paper was measured as 64% and 73% respectively and adhesion over inks and paper tested with standard industry procedure for tape test using ASTM F2252-03 or equivalent. The tape test was satisfactory over both the inks and unprinted paper. It should be emphasised that the curing was carried out in air without the use of nitrogen atmosphere (blanketing) and the formulation for Example 1A contains no added commercial and/or conventional photoinitiators. Gloss levels and tape test results over wet the litho inks were similar.

The coating tests were performed 10 times to ensure consistency of results.

The same tests were then repeated using Terbook TB40 Bible paper of 40 GSM basis weight printed with Epson inkjet inks. Again, the composition cured instantaneously when exposed to UV and provided comparable tape test results to those above. Gloss levels measured were approximately 10% lower than achieved over the printed and unprinted areas of the Stirling paper due to the significantly lower gloss level of the uncoated TB 40 sheet. For another lightweight Bible paper, additional testing was carried out to determine the increase in tensile strength. This testing was carried out using a motorised vertical test stand from Wenzhou Sundoo Instrument Company equipped with upper and lower clamping jaws assemblies. The upper clamp assembly was attached to a suitable load cell. The lower clamp assembly was attached to the movable motor driven variable speed cross arm which was stabilised for vertical movement only. The lightweight paper used was Bolloré PrimaPage New, 34 GSM lightweight paper and the coating composition of Example 1 was applied at a concentration of 2 g/m$^2$ (dry weight) on each side and UV cured.

Coated and uncoated lightweight Bible paper stock was cut into test strips 25 mm wide×100 mm in length and the tensile strength tested. At a relative humidity of 63% and 23° C. it was found that the coated substrate exhibited a 14% increase in the tensile strength in the machine direction relative to untreated stock.

The composition of Example 1A has also been tested for electron beam (EB) curing. This was undertaken independently by EB equipment manufacturer Comet AG in Flamatt, Switzerland.

Comparative testing was undertaken to determine whether there was any difference in the cured film characteristics when the curing was undertaken with and without nitrogen environments. Surprisingly, no difference could be detected with the 6 μm film in surface hardness or gloss levels. Even more surprisingly, curing of the composition was achieved in either case with only 30% of the energy required for conventional EB products. i.e. 1.0 MRad (10 kGy) by comparison with 3.0 MRad (30 kGy) at a simulated line speed of 90 m/m.

Additional testing was also undertaken for Example 1B using a Phoseon Fireline 400, LED UV unit transmitting wavelength at 395 nm. with irradiance of 24 w/cm$^2$ Similar results to the UV test results for Example 1A above were noted.

Example 2: Formulation of a Gloss Overprint Protective Varnish—Radiation Curable for Multiple Substrates

| Component | Example 2A EB or medium speed UV curable Without added photoinitiator (#1-2203) Weight % | Example 2B LED UV or high speed UV curable With added photoinitiator (#1-2203A) Weight % |
|---|---|---|
| Acrylic acid | 48.0 | 48.0 |
| Water | 4.0 | 4.0 |
| CaCl$_{2(s)}$ | 15.0 | 15.0 |
| ZnO | 15.0 | 15.0 |
| 12.5% NaOH solution | 13.0 | 12.8 |
| 25% ammonia solution | 4.2 | 4.2 |
| BYK 349 | 0.4 | 0.4 |
| Vanillin | 0.2 | 0.2 |
| Foamaster ® NS 1 | 0.2 | 0.2 |
| TPOL or Irgacure ® 2959 | — | 0.2 |
| TOTAL | 100.0 | 100.0 |

The acrylic acid, water and CaCl$_2$ were premixed, followed by addition of ZnO, and then NaOH solution. The 25% ammonia solution was then added with mixing, followed by BYK 349 (wetting agent), vanillin, Foamaster® NS. 1 (aka Foamaster® MO 2141; a non-silicone defoamer manufactured by BASF®) and, for Example 2B, TPOL or Irgacure® 2959 photoinitiator. The temperature was maintained below 90° C. throughout the mixing process.

Calcium chloride was used as an additive in this example to increase the solids content of the formulation without appreciably increasing the product viscosity, but also had the effect of plasticizing the composition, thus increasing the flexibility and gloss of the cured coating and reducing the tendency of the cured film to crack on curing.

The coatings of this Example performed in an equivalent manner to that described for compositions of Example 1 above with gloss level over paper and inks measured at 71.0% and 70.5%, respectively, when applied to the 90 g/m$^2$ Stirling offset paper. Gloss level over 34 g/m$^2$ Bolloré PrimaPage New printed sheets was 59.5% at 60°.

This coating was surprisingly found to have good adhesion to various metallic surfaces. By way of example the composition of Example 2A was applied with a #2 (Red) Meyer bar to a sheet of metallic brushed aluminium. The coated sheet was then transferred to a laboratory conveyor belt passing under a UV lamp at 15 m/m and receiving a radiation dose of 55 mJ from twin UV mercury filaments transmitting at wavelengths between 360 nm and 395 nm with nominal power of 200 W per inch.

The coatings cured instantaneously and were immediately tested for gloss level and adhesion to the aluminium surface. Gloss level was measured as 78% at 60° using KSJ MG268-F2 Glossmeter and adhesion tested with the standard industry cross-hatching procedure prior to tape testing using ASTM F2252-03 or equivalent, which produced satisfactory results.

The coating of Example 2B was also cured with LED UV on a metallic surface. The composition was applied with a #2 (Red) Meyer bar to a sheet of metallic brushed aluminium. The coated sheet was then transferred to a laboratory conveyor belt passing at 15 m/m under a Phoseon Fireline 400 LED UV unit having peak irradiance of 24 W/cm$^2$. The coatings cured instantaneously and were immediately tested for gloss level and adhesion to the aluminium surface. Gloss level was measured as 76% at 60° using KSJ MG268-F2 Glossmeter and adhesion tested with the standard industry cross-hatching procedure prior to tape testing using ASTM F2252-03 or equivalent, which produced satisfactory results.

All testing was carried out in air without the use of nitrogen atmosphere (blanketing).

The coating tests were performed 10 times to ensure consistency of results.

Example 3—Formulation of Gloss Overprint Protective Varnish—Radiation Curable

| Component | Example 3A EB or medium speed UV curable Without added photoinitiator (#7-1903) Weight % | Example 3B LED UV or high speed UV curable With added photoinitiator (# 7-1903A) Weight % |
|---|---|---|
| ZnO | 18.0 | 18.0 |
| Acrylic Acid | 48.0 | 48.0 |
| NaOH (solid) | 8.0 | 8.0 |
| Water | 19.2 | 19.0 |
| 25% solution GLO5 PVA | 6.0 | 6.0 |
| Tego ® 245 (wetting & levelling agent) | 0.4 | 0.4 |
| DC 57 (wetting & slip agent) | 0.4 | 0.4 |
| TPOL or Irgacure ® 2959 | — | 0.2 |
| TOTAL | 100.0 | 100.0 |

The solid sodium hydroxide and water were mixed in a first jacket-cooled mixing vessel. The acrylic acid was introduced to a second jacket-cooled mixing vessel equipped with high-speed stirring impeller and the contents of the first vessel were slowly added with mixing to the second. When this mixing was completed, the zinc oxide and PVA were added while mixing continued. Temperature maintained below 90° C. throughout the mixing process. The Tego® 245 and DC 57 were then added. To produce Example 3B, photoinitiator was then added.

The composition of Example 3A was applied with a #1 (Yellow) Meyer bar to sheets of 90 g/m² Stirling offset paper which had previously been printed in both text and 4-colour with HP inkjet inks and DIC wet litho inks. The coated sheets were then transferred to a laboratory conveyor belt passing under a UV lamp at 15 m/m and receiving a radiation dose of 55 mJ from each of twin UV mercury filaments transmitting at wavelengths between 360 nm and 395 nm with nominal power of 200 W per inch.

The coatings cured instantaneously and were immediately tested for gloss level and adhesion to both the inks and paper. Gloss level over the HP inkjet inks and DIC wet litho inks was measured as 63% and 74% respectively and adhesion over the inks and paper tested with standard industry procedure for tape test using ASTM F2252-03 or equivalent. The tape test was satisfactory over both the inks and unprinted paper. It should be emphasised that the curing was carried out in air without the use of nitrogen atmosphere (blanketing).

The coating tests were performed 10 times to ensure consistency of results.

The same tests were then repeated using Terbook TB40 Bible paper of 40 GSM basis weight printed with Epson inkjet inks. Again, the composition cured instantaneously when exposed to UV and provided comparable tape test results to those above. Gloss levels measured were approximately 10% lower than achieved over the printed and unprinted areas of the Stirling paper due to the significantly lower gloss level of the uncoated TB 40. For another lightweight Bible paper, additional testing was carried out to determine the increase in tensile strength. This testing was carried out using a motorised vertical test stand from Wenzhau Sundoo Instrument Company equipped with upper and lower clamping jaws assemblies. The upper clamp assembly was attached to a suitable load cell. The lower clamp assembly was attached to the movable motor driven variable speed cross arm which was stabilised for vertical movement only. The lightweight paper used was Bolloré PrimaPage New, 34 GSM lightweight paper and the coating composition of Example 3A was applied at a concentration of 2 g/m² (dry weight) on each side and UV cured.

Coated and uncoated lightweight Bible paper stock was cut into test strips 25 mm wide×100 mm in length and the tensile strength tested. At a relative humidity of 63% and 23° C. it was found that the coated substrate exhibited a 14% increase in the tensile strength in the machine direction relative to untreated stock.

The coating of Example 3B was also cured with LED UV on the same printed paper substrates as for Example 3A above, using the Phoseon Fireline 400 LED UV unit. The coatings cured instantaneously and were immediately tested for gloss level and adhesion to the paper surfaces. Gloss level over inks was measured as 76% at 60° using KSJ MG268-F2 Glossmeter and adhesion tested with the standard industry tape testing using ASTM F2252-03 or equivalent which produced satisfactory results. Other test results produced were similar to those for Example 3A above.

All testing was carried out in air without the use of nitrogen atmosphere (blanketing).

The coating tests were performed 10 times to ensure consistency of results.

Example 4: Base Compositions with Different ZnO Loadings

To test the effect of different zinc loadings, base compositions such as those given in the table below may be used and formulated as per Examples 1-3 above or Examples 5-7 below.

| Component | Example 4-I % (w/w) | Example 4-II % (w/w) | Example 4-III % (w/w) |
|---|---|---|---|
| 25% NaOH soln | 53 | 42 | 24 |
| ZnO | 5.0 | 10 | 20 |
| Acrylic acid | 40 | 48 | 56 |

As a general trend, viscosity increases with increased proportions of ZnO, the rate of cure becomes more pronounced with increased concentration of ZnO and the cured films become harder with increasing ZnO concentration, to the point of near brittleness with 20% of ZnO.

When suitably plasticised and contacted to polymeric film surfaces and UV cured, compositions of Example 4 can be polymerised to provide receptive surfaces for conventional inkjet inks which air-dry almost instantaneously on the subject surfaces with good adhesion and gloss using Epson® inks on an Epson® WF 3040 inkjet printer. When formulated without pigments or fillers, they remain clear and transparent. The compositions of Example 4 can be applied by inkjet printing if the compositions are diluted with water, or any other suitable viscosity modifier, to obtain a suitable viscosity. Other application modes can also be used, such as gravure, flexographic, Mayer Bar, or spray.

Example 5: Formulation of Gloss Overprint Protective Varnish—Radiation Curable

| Component | Example 5A<br>EB or medium<br>speed UV curable<br>Without added<br>photoinitiator<br>(#3-0104)<br>Weight % | Example 5B<br>LED or high<br>speed UV curable<br>With added<br>photoinitiator<br>(# 3-0104A)<br>Weight % |
|---|---|---|
| Acrylic acid | 55.0 | 55.0 |
| Water | 28.4 | 28.2 |
| NaOH (solid) | 5.0 | 5.0 |
| MgO | 11.0 | 11.0 |
| Tego ® 245 | 0.6 | 0.6 |
| TPOL or Irgacure ® 2959 | — | 0.2 |
| TOTAL | 100.0 | 100.0 |

The sodium hydroxide and water were mixed in a first jacket-cooled mixing vessel. The acrylic acid was introduced to a second jacket-cooled mixing vessel equipped with high-speed stirring impeller and the contents of the first vessel slowly added with mixing to the second maintaining the temperature below 90° C. When this mixing was complete, the magnesium oxide was added while mixing continued. Finally, in the case of Example 5B, the photoinitiator was added.

The composition was applied with a #1 (Yellow) Meyer bar to sheets of 90 g/m² Stirling offset paper that had previously been printed in both text and 4-colour with HP inkjet inks and DIC wet litho inks. The coated sheets were then transferred to a laboratory conveyor belt passing under a UV lamp at 15 m/m and receiving a radiation dose of 55 mJ from each of twin UV mercury filaments transmitting at wavelengths between 360 nm and 395 nm with nominal power of 200 W per inch.

The coatings cured instantaneously and were immediately tested for gloss level and adhesion to both the inks and paper. Gloss level over the HP inkjet inks and wet DIC litho inks was measured as 78% and 75% respectively and adhesion over the inks and paper tested with standard industry procedure for tape test using ASTM F2252-03 or equivalent. The tape test was satisfactory over both the inks and unprinted paper. It should be emphasised that the curing was carried out in air without the use of nitrogen atmosphere (blanketing) and the formulation of Example 6A contains no added commercial and/or conventional photoinitiators.

The coating tests were performed 10 times to ensure consistency of results.

The same tests were then repeated using Terbook TB40 Bible paper of 40 GSM basis weight printed with Epson inkjet inks. Again, the composition cured instantaneously when exposed to UV and provided comparable tape test results to those above. Gloss levels measured were approximately 12% lower than achieved over the printed and unprinted areas of the Stirling paper due to the significantly lower gloss level of the uncoated TB 40. For another lightweight Bible paper, additional testing was carried out to determine the increase in tensile strength. This testing was carried out using a motorised vertical test stand from Wenzhau Sundoo Instrument Company equipped with upper and lower clamping jaws assemblies. The upper clamp assembly was attached to a suitable load cell. The lower clamp assembly was attached to the movable motor driven variable speed cross arm which was stabilised for vertical movement only. The lightweight paper used was Bolloré PrimaPage New, 34 GSM lightweight paper and the coating composition of Example 5A was applied at a concentration of 2 g/m² (dry weight) on each side and UV cured.

Coated and uncoated lightweight Bible paper stock was cut into test strips 25 mm wide×100 mm in length and the tensile strength tested. At a relative humidity of 63% and 23° C. it was found that the coated substrate exhibited a 15% increase in the tensile strength in the machine direction relative to the untreated stock.

Additional testing was also undertaken for Example 5B using a Phoseon Fireline 400, LED UV unit transmitting wavelength at 395 nm. With peak irradiance of 24 W/cm². Similar results to the UV test results for Example 5A above were noted.

Example 6: Pigmented Primer/Coating—Radiation Cure

| Component | Example 6A<br>EB or medium<br>speed UV curable<br>Without added<br>photoinitiator<br>(#2-0903)<br>Weight % | Example 6B<br>LED or high<br>speed UV curable<br>With added<br>photoinitiator<br>(#3-0903)<br>Weight % |
|---|---|---|
| Composition from Example 2A (#1-2203) | 40.0 | 40.0 |
| Water | 24.0 | 24.0 |
| 25% PV Alcohol soln. | 4.0 | 4.0 |
| Quatramine C16/50 (Cationic wetting agent) | 0.6 | 0.6 |
| Clay (calcined kaolin) | 20.0 | 20.0 |
| $CaCO_3$ | 10.0 | 10.0 |
| AB P-A (Optical brightening agent) | 0.8 | 0.8 |
| 2% purple solution | 0.2 | 0.2 |
| NS1 antifoam | 0.4 | — |
| TPOL or Irgacure ® 2959 | — | 0.4 |
| TOTAL | 100.0 | 100.0 |

The components in the table above were added together in the order shown with mixing while maintaining the temperature below 90° C. The resulting viscosity was 300-400 cps (#4/100/25° C.).

The coatings of this example performed in an equivalent manner to that described for compositions of Example 1A & B above with respect to cure speed and tensile strength increase.

The pigmented primer/coating was applied to a reel of 40 GSM. TB 40 Bible Paper running at a line speed of 100 m/m. on a Rotamag Qantum 8/340 press line manufactured by Rotary Engineering Pty Ltd.

The application was via an anilox roller onto a rubber transfer roller and then to the paper surface. UV curing was achieved with twin 200 W per inch conventional mercury arc UV lamps. The reel was re-run to coat the reverse side. The reel was then printed 4-colour inkjet on both sides on a Canon® Océ ColourStream 3700 commercial inkjet press line. The print definition, colour density and absence of show-through was deemed to be of commercial quality. Inkjet printing on this TB 40 Bible paper could not previously be achieved due to unacceptable show-through and lack of print definition due to dot gain on the porous surface.

Additional testing was carried out to determine the increase in tensile strength. This testing was carried out using a motorised vertical test stand from Wenzhau Sundoo Instrument Company equipped with upper and lower clamping jaws assemblies. The upper clamp assembly was attached to a suitable load cell. The lower clamp assembly was attached to the movable motor driven variable speed cross arm which was stabilised for vertical movement only. Coated and printed and uncoated TB 40 paper stock was cut into test strips 25 mm wide×100 mm in length and the tensile strength tested. At a relative humidity of 63% and 23° C. it was found that the coated substrate exhibited a 15% increase in the tensile strength in the machine direction relative to untreated stock.

The composition of Example 6A has also been tested for electron beam (EB) curing. This was undertaken independently by EB equipment manufacturer Comet AG in Flamatt, Switzerland.

Comparative testing was undertaken to determine whether there was any difference in the cured film characteristics when the curing was undertaken with and without nitrogen environments. Surprisingly, no difference could be detected with the 6 μm film in surface hardness or gloss levels. Even more surprisingly, as with Example 1A, curing of the composition was achieved in either case with only 30% of the energy required for conventional EB products. i.e. 1.0 MRad (10 kGy) by comparison with 3.0 MRad (30 kGy) at a simulated line speed of 90 m/m.

Example 7: Radiation Curable Yellow Water-Based Inkjet Ink

| Component | Example 7A<br>EB or medium<br>speed UV curable<br>Without added<br>photoinitiator<br>(#3-1801)<br>Weight % | Example 7B<br>LED UV or high<br>speed UV curable<br>With added<br>photoinitiator<br>(#3-1801A)<br>Weight % |
|---|---|---|
| 25% NaOH | 17.0 | 17.0 |
| ZnO | 12.0 | 12.0 |
| CaCl$_2$ | 11.0 | 11.0 |
| Acrylic Acid | 38.0 | 38.0 |
| Water | 15.8 | 14.8 |
| Acid Yellow 23 - dye | 6.0 | 6.0 |
| BYK 346 | 0.2 | 0.2 |
| TPOL or Irgacure ® 2959 | — | 1.0 |
| TOTAL | 100.0 | 100.0 |

The components in the table above were added in the order shown with mixing while maintaining the temperature below 90° C. Water was added in sufficient quantity to obtain the required final viscosity (for dilution purposes). The resulting target viscosity was 25 cps (#4/100/25° C.).

The compositions were applied to sheets of 90 g/m$^2$ Stirling offset paper using an airless spray gun as a surrogate to simulate the jetting action of inkjet printing. The printed sheets were then transferred to a laboratory conveyor belt passing under a UV lamp at 15 m/m and receiving a radiation dose of 55 mJ from twin UV mercury filaments transmitting at wavelengths between 360 nm and 395 nm with nominal power of 200 W per inch.

The ink composition cured instantaneously. Subsequent analysis of the print results, showed high gloss levels in the range 60% to 65% measured at 60° using a KSJ MG268-F2 Glossmeter. Colour density was deemed to be of commercial quality and the adhesion of the ink film to the paper was tested with standard industry procedure for tape test using ASTM F2252-03 or equivalent. The tape test was satisfactory with the ink providing excellent adhesion. The print tests were performed 10 times to ensure consistency of results.

Curing was carried out in air without the use of nitrogen atmosphere (blanketing) and the ink of Example 7A contained no added commercial and/or conventional photoinitiator. The composition of Example 8B was applied to sheets of 90 g/m$^2$ Stirling offset paper using an airless spray gun as a surrogate to simulate the jetting action of inkjet printing. The printed sheets were then transferred to a laboratory conveyor belt passing at 15 m/m under a Phoseon Fireline 400 LED UV unit having peak irradiance of 24 W/cm$^2$. The composition cured instantaneously.

Subsequent analysis of the print results, showed high gloss levels in the range 60% to 65% measured at 60° using a KSJ MG268-F2 Glossmeter. Colour density was deemed to be of commercial quality and the adhesion of the ink film to the paper was tested with standard industry procedure for tape test using ASTM F2252-03 or equivalent. The tape test was satisfactory with the ink providing excellent adhesion. The print tests were performed 10 times to ensure consistency of results.

Curing was carried out in air without the use of nitrogen atmosphere (blanketing).

Example 8: Formulation of a Magenta Flexographic Printing Ink—Radiation Curable

| Component | Example 8A<br>EB or medium<br>speed UV curable<br>Without added<br>photoinitiator<br>(#8-1903)<br>Weight % | Example 8B<br>LED UV or High<br>Speed UV curable<br>With added<br>photoinitiator<br>(#8-1903A)<br>Weight % |
|---|---|---|
| Composition from Example 3A (#7 -1903) | 79.0 | 78.0 |
| 25% solution GLO 5 PVA | 5.0 | 5.0 |
| Pigment dispersion SVRS56 Pink R122 | 16.0 | 16.0 |
| TPOL or Irgacure ® 2959 | — | 1.0 |
| TOTAL | 100.0 | 100.0 |

Composition 7-1903 from Example 3A was placed in a mixer. PVA and the pigment dispersion were then mixed in slowly while maintaining the temperature below 90° C. To create the composition of Example 8B, the photoinitiator was added.

The viscosity was then checked on the Brookfield spindle 4/100 rpm/25 Deg C. with a target range of 500-800 cps. The ink viscosity was then adjusted as necessary with increments of added water to achieve the target viscosity range.

The flow characteristics were then measured. This was done using the glass plate method. This is a somewhat simplistic but reasonably accurate method using comparison of the subject ink with a commercially available flexo ink whereby 5 gms-10 gms was placed on the glass plate which is positioned almost vertically at 80°. The flow-length is then measured in millimetres at one minute and three minutes and compared with the flow-length of a standard commercially available UV flexo ink from Prismatic Pty Ltd., UViflex Magenta. An average reading from five tests was recorded for each of the two inks. These are shown FIG. 3. The results were reasonably consistent indicating that the subject ink would perform satisfactorily on press.

The subject ink was then applied to sheets of 90 g/m² Stirling offset paper using a handheld laboratory flexo roller. The printed sheets were then transferred to a laboratory conveyor belt passing under a UV lamp at 15 m/m and receiving a radiation dose of 55 mJ from each of twin UV mercury filaments transmitting at wavelengths between 360 nm and 395 nm with nominal power of 200 W per inch.

The ink cured instantaneously and was immediately tested for gloss level and adhesion to the paper. Gloss levels over the ink and paper was measured as 71% and 73% respectively and adhesion over ink and paper tested with standard industry procedure for tape test using ASTM F2252-03 or equivalent. The tape test was satisfactory over both the inks and unprinted paper. It should be emphasised that the curing was carried out in air without the use of nitrogen atmosphere (blanketing) and the formulation of Example 9A contains no added commercial and/or conventional photoinitiators. The coating tests were performed 10 times to ensure consistency of results.

Curing with LED UV was then undertaken. The subject ink of Example 8B was applied to sheets of 90 g/m² Stirling offset paper using a handheld laboratory flexo roller. The printed sheets were then transferred to a laboratory conveyor belt passing at 15 m/m under a Phoseon Fireline 400 LED UV unit having peak irradiance of 24 W/cm². The coatings cured instantaneously and were immediately tested for gloss level and adhesion to the paper. Gloss levels over the ink and paper was measured as 70% and 72% respectively and adhesion over ink and paper tested with standard industry procedure for tape test using ASTM F2252-03 or equivalent. The tape test was satisfactory over both the ink and unprinted paper. It should be emphasised that the curing was carried out in air without the use of nitrogen atmosphere (blanketing). The coating tests were performed 10 times to ensure consistency of results.

Although the invention has been described with reference to specific examples, it will be appreciated by those skilled in the art that the invention may be embodied in many other forms in particular features of any one of the various described examples may be provided in any combination in any of the other described examples.

The invention claimed is:

1. A UV or electron beam (EB) curable composition for priming, printing on, or varnishing a substrate comprising:
a metal salt comprising an anionic form of an organic compound, said organic compound comprising at least one vinyl group and a carboxylic acid group;
and water,
wherein the composition has a water content of between about 10 and about 50 wt %,
wherein the composition cures under UV or EB irradiation; and
wherein the composition is a primer, printing ink or varnish.

2. The curable composition according to claim 1, wherein the metal salt comprises a metal selected from the group consisting of: aluminium, barium, calcium, cobalt, copper, iron, magnesium, manganese, nickel, tin, titanium, vanadium, zirconium and zinc.

3. The curable composition according to claim 1, wherein metal salt is present in the composition at a concentration of between about 5 and about 50 wt %.

4. The curable composition according to claim 1, wherein the metal salt is zinc or magnesium acrylate or methacrylate.

5. The curable composition according to claim 1, wherein the composition comprises an additional component selected from the group consisting of: a co-monomer, a dye, a pigment, a filler, a wetting agent, and a defoamer or a mixture of any two or more of these.

6. The curable composition according to claim 1, wherein the composition comprises a co-monomer that is selected from the group consisting of: a molecular form of the organic compound, a sodium salt of the organic compound, and an ammonium salt of the organic compound.

7. The curable composition according to claim 6, wherein the co-monomer is present in the composition at a concentration of between about 5 and 35 wt %.

8. The curable composition according to claim 1, wherein the composition is devoid of added photoinitiator, thermal initiator or polymerisation catalyst.

9. A method of preparing a curable composition comprising a metal salt, the method comprising the steps of:
reacting a metal compound with (i) an organic compound or (ii) with a hydroxide salt and an organic compound in aqueous solution;
wherein the organic compound comprises a carboxylic acid group and at least one vinyl group, thereby producing the metal salt, wherein the composition has a water content of between about 10 and about 50 wt %;
wherein the composition cures under UV or EB irradiation; and
wherein the composition is a primer, printing ink or varnish.

10. The method according to claim 9, wherein the metal compound is a metal oxide, a metal carbonate or a metal hydrogen carbonate salt.

11. The method according to claim 9, wherein the metal compound is selected from the group consisting of: cerium oxide, chromium oxide, tin oxide, titanium oxide, vanadium oxide, magnesium oxide, zirconium oxide and zinc oxide.

12. The method according to claim 9, wherein the organic compound is methacrylic acid or acrylic acid.

13. The method according to claim 9, wherein the method comprises adding an additional component selected from the group consisting of: a co-monomer, a dye, a pigment, a filler, a wetting agent, and a defoamer or a mixture of any two or more of these.

14. The method according to claim 9, wherein a molar excess (with respect to the metal compound) of organic compound is used in the reacting step.

15. The method according to claim 9, wherein the method further comprises adjusting the pH of the composition to between 5 and 7.

16. The method according to claim 9, wherein the method does not comprise adding a photoinitiator, thermal initiator or polymerisation catalyst to the composition.

17. The method according to claim 9, wherein the method further comprises the step of adding a filler or plasticiser selected from the group consisting of:
calcium chloride, calcium carbonate, urea, or a water-soluble salt.

18. A method for priming, printing on, or varnishing a substrate, the method comprising the steps of:
applying or printing a curable composition according to claim 1 onto a substrate; and
curing the curable composition to thereby provide a primed, printed or varnished substrate.

19. The method according to claim 18, wherein no nitrogen blanket is required for curing.

20. A printing press comprising:
a priming means for applying a primer composition to a low grade or inexpensive substrate to be coated;
UV or EB means to cure said primer to produce a primed high quality printable substrate;
printing means to print ink onto said primed printable substrate, optionally wherein the ink is not cured prior to varnishing;
optionally, means to cure said ink to produce a printed substrate;
varnishing means for applying a varnish composition to the printed substrate; and
means to cure said varnish in atmospheric air without a nitrogen blanket to produce a coated substrate;
wherein at least two, or optionally all three, of the primer composition, the ink, and the varnish composition comprise a curable composition according to claim 1.

* * * * *